(12) United States Patent
Tamura et al.

(10) Patent No.: US 10,920,012 B2
(45) Date of Patent: *Feb. 16, 2021

(54) COPOLYMER AND COMPOSITION

(71) Applicant: FUJIFILM Corporation, Tokyo (JP)

(72) Inventors: Akio Tamura, Kanagawa (JP); Reiko Fukagawa, Kanagawa (JP); Taketo Otani, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,784

(22) Filed: Nov. 28, 2018

(65) Prior Publication Data

US 2019/0092899 A1 Mar. 28, 2019

Related U.S. Application Data

(63) Continuation of application No. PCT/JP2017/023078, filed on Jun. 22, 2017.

(30) Foreign Application Priority Data

| Jun. 27, 2016 | (JP) | 2016-126440 |
| Sep. 30, 2016 | (JP) | 2016-193814 |
| Jan. 27, 2017 | (JP) | 2017-013698 |

(51) Int. Cl.
| C08G 61/04 | (2006.01) |
| C08F 230/06 | (2006.01) |
| C09D 133/14 | (2006.01) |
| C09J 143/00 | (2006.01) |
| C09D 143/00 | (2006.01) |
| C09J 133/14 | (2006.01) |
| C08F 220/22 | (2006.01) |
| C08G 61/08 | (2006.01) |
| C08F 230/08 | (2006.01) |
| C09J 143/02 | (2006.01) |
| C08L 65/00 | (2006.01) |

(52) U.S. Cl.
CPC ............ *C08G 61/04* (2013.01); *C08F 230/06* (2013.01); *C08F 230/08* (2013.01); *C08G 61/08* (2013.01); *C09D 133/14* (2013.01); *C09D 143/00* (2013.01); *C09J 133/14* (2013.01); *C09J 143/00* (2013.01); *C09J 143/02* (2013.01); *C08F 220/22* (2013.01); C08G 2261/12 (2013.01); C08G 2261/135 (2013.01); C08G 2261/144 (2013.01); C08G 2261/146 (2013.01); C08G 2261/148 (2013.01); C08G 2261/1424 (2013.01); C08G 2261/1426 (2013.01); C08G 2261/1432 (2013.01); C08G 2261/1644 (2013.01); C08G 2261/418 (2013.01); C08G 2261/724 (2013.01); C08G 2261/95 (2013.01); *C08L 65/00* (2013.01)

(58) Field of Classification Search
CPC combination set(s) only.
See application file for complete search history.

(56) References Cited

U.S. PATENT DOCUMENTS

| 2,931,788 | A | * | 4/1960 | Hoffmann | ............... C07F 5/025 |
| | | | | | 526/239 |
| 8,410,190 | B2 | * | 4/2013 | Zhu | ........................... C08J 7/16 |
| | | | | | 523/106 |
| 9,095,141 | B2 | * | 8/2015 | Carlson | .................. A01N 55/08 |
| 9,121,998 | B2 | * | 9/2015 | Chen | ...................... G02B 1/043 |
| 2005/0203256 | A1 | * | 9/2005 | Destarac | ............. C08F 293/005 |
| | | | | | 525/337 |
| 2006/0106178 | A1 | * | 5/2006 | Destarac | ................... C08F 4/00 |
| | | | | | 526/222 |

(Continued)

FOREIGN PATENT DOCUMENTS

| CN | 102271719 A | 12/2011 |
| CN | 102574343 A | 7/2012 |

(Continued)

OTHER PUBLICATIONS

Jones et al. (2017). Organic Coatings—Science and Technology (4th Edition)—17.1.2 Vinyl Chloride Dispersion Copolymers. John Wiley & Sons., pp. 235-245. Retrieved from (Year: 2017).*
"Trifluoroethyl methacrylate", ChemSpider, retrieved from http://www.chemspider.com/Chemical-Structure.19953236.html on Dec. 2019. (Year: 2019).*
International Search Report issued in PCT/JP2017/023078 dated Sep. 19, 2017.
Written Opinion issued in PCT/JP2017/023078 dated Sep. 19, 2017.
International Preliminary Report on Patentability completed by WIPO dated Jan. 1, 2019, in connection with International Patent Application No. PCT/JP2017/023078.
Office Action, issued by the Japanese Patent Office dated Aug. 13, 2019, in connection with Japanese Patent Application No. 2017-013698.

(Continued)

*Primary Examiner* — Nicole M. Buie-Hatcher
(74) *Attorney, Agent, or Firm* — Edwards Neils LLC; Jean C. Edwards, Esq.

(57) ABSTRACT

A copolymer includes a repeating unit represented by Formula (I); and a repeating unit represented by Formula (II), in Formula (I), $R^1$ represents a hydrogen atom or an alkyl group having 1 to 20 carbon atoms; $R^2$ represents an alkyl group having 1 to 20 carbon atoms and having at least one fluorine atom as a substituent, or a group including —Si $(R^{a3})(R^{a4})O$—; L represents a divalent linking group as defined herein; and $R^{a3}$ and $R^{a4}$ each independently represent an alkyl group as defined herein, in Formula (II), $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; $R^{11}$ and $R^{12}$ may be linked to each other; and $X^1$ represents a divalent linking group.

3 Claims, No Drawings

(56) References Cited

U.S. PATENT DOCUMENTS

| | | | |
|---|---|---|---|
| 2009/0306297 A1* | 12/2009 | Destarac | C08F 2/38 |
| | | | 525/205 |
| 2010/0162663 A1 | 7/2010 | McGee et al. | |
| 2012/0172486 A1 | 7/2012 | Zhu et al. | |
| 2012/0194779 A1 | 8/2012 | Zhang et al. | |
| 2013/0057809 A1 | 3/2013 | Nakamura et al. | |
| 2013/0222884 A1 | 8/2013 | Moriyama et al. | |
| 2013/0337161 A1* | 12/2013 | Akimoto | C09C 1/309 |
| | | | 427/162 |
| 2016/0068756 A1* | 3/2016 | Moriya | C09K 19/3494 |
| | | | 428/1.31 |
| 2016/0085102 A1 | 3/2016 | Ohmuro et al. | |
| 2016/0223719 A1 | 8/2016 | Ishiguro | |
| 2017/0017118 A1 | 1/2017 | Yonemoto et al. | |
| 2019/0204646 A1 | 7/2019 | Ohmuro et al. | |

FOREIGN PATENT DOCUMENTS

| | | |
|---|---|---|
| CN | 103293816 A | 9/2013 |
| CN | 103314063 A | 9/2013 |
| CN | 107428996 A | 12/2017 |
| JP | 07-126323 A | 5/1995 |
| JP | 2004-163610 A | 6/2004 |
| JP | 2006-124639 A | 5/2006 |
| JP | 2008-225281 A | 9/2008 |
| JP | 2011-070022 A | 4/2011 |
| JP | 2013-505157 A | 2/2013 |
| JP | 2013-054201 A | 3/2013 |
| JP | 2014-199413 A | 10/2014 |
| JP | 2016-066041 A | 4/2016 |
| JP | 2016-169297 A | 9/2016 |
| WO | 2014/196638 A1 | 12/2014 |
| WO | 2014/199934 A1 | 12/2014 |
| WO | 2015/053359 A1 | 4/2015 |
| WO | 2015/147287 A1 | 10/2015 |

OTHER PUBLICATIONS

Office Action, issued by the Korean Intellectual Property Office dated Dec. 3, 2019, in connection with Korean Patent Application No. 10-2018-7034461.

Office Action, issued by the State Intellectual Property Office dated Aug. 19, 2020, in connection with Chinese Patent Application No. 201780039159.6.

\* cited by examiner

COPOLYMER AND COMPOSITION

CROSS-REFERENCE TO RELATED APPLICATIONS

This is a continuation of International Application No. PCT/JP2017/023078 filed on Jun. 22, 2017, which was published under Article 21(2) in Japanese, and which claims priority under 35 U.S.C. § 119(a) from Japanese Patent Application No. 2016-126440 filed on Jun. 27, 2016, Japanese Patent Application No. 2016-193814 filed on Sep. 30, 2016 and Japanese Patent Application No. 2017-013698 filed on Jan. 27, 2017. The above applications are hereby expressly incorporated by reference, in their entirety, into the present application.

BACKGROUND OF THE INVENTION

1. Field of the Invention

The present invention relates to a copolymer and a composition.

2. Description of the Related Art

An optical film, which is a kind of functional film, is used in a polarizing plate.

A polarizing plate is used as a member of a liquid crystal display (LCD) device and an organic electroluminescent diode (organic EL) display (OLED), and plays an important role in display performance. An ordinary polarizing plate has a configuration in which an optical film is laminated on one surface or both surfaces of a polarizer of a polyvinyl alcohol (PVA)-based resin processed for adsorption orientation with a dichroic dye such as an iodine complex or the like.

In recent years, an increase in size, a reduction in thickness, and flexibilization of a display device have been proceeded. Accordingly, a polarizing plate is required to have a function different from that of the related art and is also required to be thin.

In order to reduce the thickness of a polarizing plate, it is required to reduce the thickness of an optical film constituting the polarizing plate. For example, WO2014/199934A discloses a method in which a coating film is provided on a temporary support, a polarizer is laminated on the coating film, and the temporary support is then peeled off from the coating film to prepare a polarizing plate having a coating film with a film thickness of less than 10 μm laminated thereon.

In addition, a fluorine-containing copolymer or a copolymer having a siloxane bond may be added to a composition for forming a functional film as a leveling agent.

SUMMARY OF THE INVENTION

WO2014/199934A discloses a coating film mainly formed of a cyclo olefin polymer and according to the study of the present inventors, it has been found that the coating film is a coating film which is excellent in peelability from the temporary support and has a low birefringence, but this coating film has insufficient adhesiveness with a polarizer.

In general, the function of the film, which is a feature, is largely dependent on the main material of the film. However, the main material is not necessarily suitable for adhesion with other layers, films, or other articles, and the main material is rather disadvantageous for adhesion in many cases.

In view of the above problems, an object of the present invention, that is, an object to be achieved by the present invention is to provide a copolymer capable of sufficiently bonding a functional film with other layers, films, or other articles, and a composition containing the copolymer.

The present inventors have found that the above object can be achieved by the following action of the copolymer of the present invention.

That is, in a case of bonding a functional film containing the copolymer of the present invention with other layers, films, or other articles, the copolymer of the present invention contained in the functional film can be unevenly distributed on the surface of the functional film by the action of a repeating unit represented by Formula (I). Since a repeating unit represented by Formula (II) in the copolymer forms a crosslinked reaction product with other layers, films, or other articles, it is considered that the adhesiveness between the functional film and other layers, films, or other articles can be enhanced.

Accordingly, the present invention which is specific means for achieving the above object is as follows.

<1> A copolymer comprising: a repeating unit represented by Formula (I); and a repeating unit represented by Formula (II),

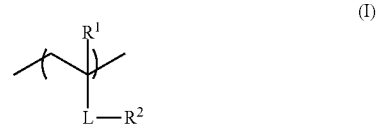

in Formula (I), $R^1$ represents a hydrogen atom or an alkyl group having 1 to 20 carbon atoms; $R^2$ represents an alkyl group having 1 to 20 carbon atoms and having at least one fluorine atom as a substituent, or a group including —Si$(R^{a3})(R^{a4})$O—; L represents a divalent linking group comprising at least one selected from the group consisting of —O—, —(C=O)O—, —O(C=O)—, a divalent aliphatic chain group and a divalent aliphatic cyclic group; and $R^{a3}$ and $R^{a4}$ each independently represent an alkyl group having 1 to 12 carbon atoms which may have a substituent,

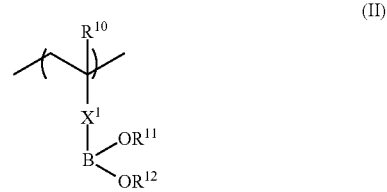

in Formula (II). $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; $R^{11}$ and $R^{12}$ may be linked to each other; and $X^1$ represents a divalent linking group.

<2> The copolymer according to <1>, in which $R^2$ of the repeating unit represented by Formula (I) represents an alkyl group having 1 to 20 carbon atoms and having at least one fluorine atom as a substituent.

<3> The copolymer according to <1> or <2>, in which the repeating unit represented by Formula (I) is a repeating unit represented by Formula (III),

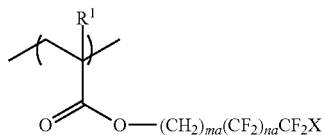

(III)

in Formula (III), $R^1$ represents a hydrogen atom or an alkyl group having 1 to 20 carbon atoms; ma and na each independently represent an integer of 1 to 20; and X represents a hydrogen atom or a fluorine atom.

<4> The copolymer according to any one of <1> to <3>, in which $X^1$ of the repeating unit represented by Formula (II) includes at least one linking group selected from —(C=O)O—, —O(C=O)—, —(C=O)NH—, —O—, —CO—, —NH—, —O(C=O)—NH—, —O(C=O)—O—, and —CH$_2$— and has 7 or more carbon atoms.

<5> The copolymer according to any one of <1> to <4>, in which the repeating unit represented by Formula (II) is a repeating unit represented by Formula (V),

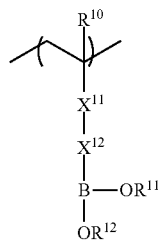

(V)

in Formula (V), $R^{10}$ represents a hydrogen atom or an alkyl group having 1 to 20 carbon atoms; $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group; and $R^{11}$ and $R^{12}$ may be linked to each other; $X^{11}$ represents a divalent linking group comprising at least one selected from the group consisting of —(C=O)O—, —O(C=O)—, —(C=O)NH—, —O—, —CO— and —CH$_2$—; and $X^{12}$ represents a divalent linking group including at least one linking group selected from —(C=O)O—, —O(C—O)—, —(C=O)NH—, —O—, —CO—, —NH—, —O(C=O)—NH—, —O(C=O)—O— and —CH$_2$— and including at least one substituted or unsubstituted aromatic ring; and a total number of carbon atoms of $X^{11}$ and $X^{12}$ is 7 or more.

<6> The copolymer according to any one of <1> to <5>, in which $R^{11}$ and $R^{12}$ of the repeating unit represented by Formula (II) or (V) represent a hydrogen atom.

<7> The copolymer according to any one of <1> to <6>, further comprising: a thermally crosslinking group.

<8> A composition comprising: the copolymer according to any one of <1> to <7>.

According to the present invention, it is possible to provide a copolymer capable of sufficiently bonding a functional film with other layers, films, or other articles, and a composition containing the copolymer.

DESCRIPTION OF THE PREFERRED EMBODIMENTS

Hereinafter, the present invention will be described in detail.

The numerical range which is shown by "to" used in the present specification means the range including the numerical values described before and after "to" as the lower limit and the upper limit, respectively.

In the present specification, the expression "(meth)acrylic group" is used as the concept including "either or both of an acrylic group and a methacrylic group". The same applies to "(meth)acrylic acid", "(meth)acrylamide", "(meth)acryloyl group" and the like.

[Copolymer (a)]

A copolymer of the present invention (hereinafter, also referred to as "copolymer (a)") includes a repeating unit represented by Formula (I) and a repeating unit represented by Formula (II).

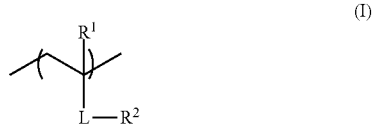

(I)

In Formula (I), $R^1$ represents a hydrogen atom or an alkyl group having 1 to 20 carbon atoms, $R^2$ represents an alkyl group having 1 to 20 carbon atoms and having at least one fluorine atom as a substituent, or a group including —Si($R^{a3}$)($R^{a4}$)O—, and L represents a divalent linking group comprising at least one selected from the group consisting of —O—, —(C=O)O—, —O(C=O)—, a divalent aliphatic chain group, and a divalent aliphatic cyclic group. $R^{a3}$ and $R^{a4}$ each independently represent an alkyl group having 1 to 12 carbon atoms which may have a substituent.

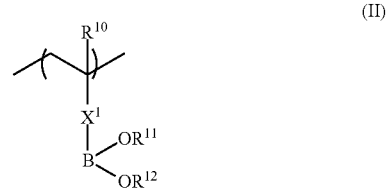

(II)

In Formula (II), $R^{10}$ represents a hydrogen atom or an alkyl group having 1 to 20 carbon atoms, $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group, and $R^{11}$ and $R^{12}$ may be linked to each other. $X^1$ represents a divalent linking group.

In Formula (I), $R^1$ represents a hydrogen atom or an alkyl group having 1 to 20 carbon atoms, preferably represents a hydrogen atom or an alkyl group having 1 to 10 carbon atoms, more preferably represents a hydrogen atom or an alkyl group having 1 to 4 carbon atoms, and even more preferably represents a hydrogen atom or a methyl group.

In Formula (I), $R^2$ preferably represents an alkyl group having 1 to 20 carbon atoms and having at least one fluorine atom as a substituent (fluoroalkyl group), more preferably represents a fluoroalkyl group having 1 to 18 carbon atoms, and even more preferably represents a fluoroalkyl group having 2 to 15 carbon atoms. In addition, the number of fluorine atoms in the fluoroalkyl group is preferably 1 to 25, more preferably 3 to 21, and most preferably 5 to 21.

In Formula (I), L represents a divalent linking group comprising at least one selected from the group consisting of —O—, —(C=O)O—, —O(C=O)—, a divalent aliphatic chain group, and a divalent aliphatic cyclic group. —(C=O)O— represents that the carbon atom on the $R^1$ side is bonded with C=O and $R^2$ is bonded with O, and —O(C=O)— represents that the carbon atom on the $R^1$ side is bonded with O and $R^2$ is bonded with C=O.

The divalent aliphatic chain group represented by L is preferably an alkylene group having 1 to 20 carbon atoms and more preferably an alkylene group having 1 to 10 carbon atoms.

The divalent aliphatic cyclic group represented by L is preferably a cycloalkylene group having 3 to 20 carbon atoms and more preferably a cycloalkylene group having 3 to 15 carbon atoms.

L is preferably —(C=O)O— or —O(C=O)— and more preferably —(C=O)O—.

From the viewpoint of surface uneven distribution advantageous for adhesiveness and from the viewpoint of radical polymerization, it is preferable that the repeating unit represented by Formula (I) is a repeating unit represented by Formula (III).

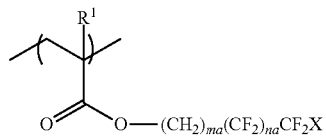

(III)

In Formula (III), $R^1$ represents a hydrogen atom or an alkyl group having 1 to 20 carbon atoms, ma and na each independently represent an integer of 1 to 20, and X represents a hydrogen atom or a fluorine atom.

In Formula (III), $R^1$ is the same as $R^1$ in Formula (I), and the preferable range thereof is also the same.

In Formula (III), ma and na represent an integer of 1 to 20.

From the viewpoint of surface uneven distribution advantageous for adhesiveness and from the viewpoint of ease of material availability and production, ma in Formula (III) is preferably an integer of 1 to 8 and more preferably an integer of 1 to 5. In addition, na is preferably an integer of 1 to 15, more preferably an integer of 1 to 12, even more preferably an integer of 2 to 10, and most preferably an integer of 5 to 7.

In Formula (III), X represents a hydrogen atom or a fluorine atom and preferably represents a fluorine atom.

The repeating unit represented by Formula (I) or (III) can be obtained by polymerizing a monomer, and examples of preferable monomers include 2,2,2-trifluoroethyl (meth)acrylate, 2,2,3,3,3-tetrafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 1H, 1H,3H-tetrafluoropropyl (meth)acrylate, 1H, 1H,5H-octafluoropentyl (meth)acrylate, 1H, 1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth) acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, and 3-(perfluoro-7-methyloctyl)-2-hydroxypropyl (meth)acrylate.

As described above, in Formula (I), $R^2$ is preferably an alkyl group having 1 to 20 carbon atoms and having at least one fluorine atom as a substituent, and as another aspect, in Formula (I), $R^2$ has a repeating unit including a siloxane bond represented by —Si($R^{a3}$)($R^{a4}$)O-(polysiloxane structure). In this case, as the copolymer (a), a graft copolymer in which the polysiloxane structure is introduced into the side chain is preferable. A compound having a siloxane bond for obtaining this graft copolymer is more preferably a compound represented by Formula (IV).

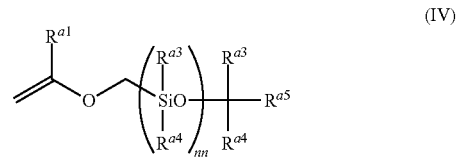

(IV)

$R^{a3}$ and $R^{a4}$ each independently represent an alkyl group, a haloalkyl group, or an aryl group. As the alkyl group, an alkyl group having 1 to 10 carbon atoms is preferable. Examples thereof include a methyl group, an ethyl group, and a hexyl group. As the haloalkyl group, a fluorinated alkyl group having 1 to 10 carbon atoms is preferable. Examples thereof include a trifluoromethyl group, and a pentafluoroethyl group. As the aryl group, an aryl group having 6 to 20 carbon atoms is preferable. Examples thereof include a phenyl group, and a naphthyl group. Among these, $R^{a3}$ and $R^{a4}$ preferably represent a methyl group, a trifluoromethyl group, or a phenyl group and particularly preferably represent a methyl group.

$R^{a1}$ represents a hydrogen atom or an alkyl group having 1 to 20 carbon atoms. $R^{a5}$ preferably represents an alkyl group having 1 to 12 carbon atoms and more preferably represents an alkyl group having 1 to 4 carbon atoms.

nn is preferably 10 to 1000, more preferably 20 to 500, and even more preferably 30 to 200.

In Formula (IV), nn $R^{a3}$'s may be the same as or different from each other and nn $R^{a4}$'s may be the same as or different from each other.

As the compound having a siloxane bond for graft copolymerization, a polysiloxane macromonomer containing a (meth)acryloyl group at one terminal (for example, SILAPLANE 0721, and SILAPLANE 0725 (all trade names, manufactured by JNC Corporation), AK-5, AK-30, and AK-32 (all trade names, manufactured by Toagosei Co., Ltd.), KF-100T, X-22-169AS, KF-102, X-22-37011E, X-22-164B, X-22-164C, X-22-5002, X-22-173B, X-22-174D, X-22-167B, and X-22-161AS (all trade names, manufactured by Shin-Etsu Chemical Co., Ltd.)) may be exemplified.

Next, Formula (II) will be described.

The copolymer (a) also has a repeating unit represented by Formula (II). The repeating unit represented by Formula (II) has a strong interaction with a hydroxyl group. That is, in a case where a coating solution of a composition including the copolymer (a) (composition for forming a functional film) is applied to a substrate (substrate film) and then an adhesive layer having a hydroxyl group is provided on the coating solution surface, a part or all of the repeating unit represented by Formula (II) interacts with the hydroxyl group so that the copolymer (a) is diffused and adsorbed into the interface of the adhesive layer having a hydroxyl group and the inner side of the adhesive layer.

Accordingly, after the functional film and the adhesive layer are in contact with each other, the copolymer (a) having the repeating unit represented by Formula (II), which is added to the coating solution, is present at the functional film, the adhesive layer, and the interface between both layers in the form of a copolymer having the chemical structure of Formula (II) as it is or a derivative (crosslinked reaction product) having a structure in which the repeating unit represented by Formula (II) reacts with the hydroxyl group of the adhesive layer.

As described above, since the copolymer (a) having the repeating unit represented by Formula (II) interacts with the adhesive layer, regardless of the ration between the adhesive layer and/or the copolymer (a) present in the functional film, the adhesiveness between the functional film including the copolymer (a) and the adhesive layer can be enhanced.

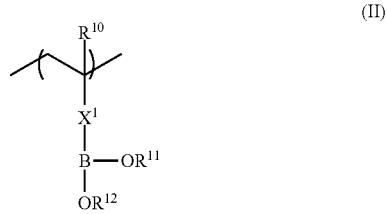

(II)

In Formula (II), $R^{10}$ represents a hydrogen atom or an alkyl group having 1 to 20 carbon atoms, $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group, and $R^{11}$ and $R^{12}$ may be linked to each other. $X^1$ represents a divalent linking group.

In Formula (II), $R^{10}$ represents a hydrogen atom or an alkyl group having 1 to 20 carbon atoms, preferably represents a hydrogen atom or an alkyl group having 1 to 10 carbon atoms, more preferably represents a hydrogen atom or an alkyl group having 1 to 4 carbon atoms, and most preferably represents a hydrogen atom or a methyl group.

The substituted or unsubstituted aliphatic hydrocarbon group represented by each of $R^{11}$ and $R^{12}$ in Formula (II) includes a substituted or unsubstituted alkyl group, a substituted or unsubstituted alkenyl group, and a substituted or unsubstituted alkynyl group. Specific examples of the alkyl group include linear, branched, or cyclic alkyl groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methylhexyl group, a cyclopentyl group, a cyclohexyl group, a 1-adamantyl group, and a 2-norbornyl group.

Specific examples of the alkenyl group include linear, branched, or cyclic alkyl alkenyl groups such as a vinyl group, a 1-propenyl group, a 1-butenyl group, a 1-methyl-1-propenyl group, a 1-cyclopentenyl group, and a 1-cyclohexenyl group.

Specific examples of the alkynyl group include an ethynyl group, a 1-propynyl group, a 1-butynyl group, and a 1-octynyl group.

Specific examples of the substituted or unsubstituted aryl group represented by each of $R^{11}$ and $R^{12}$ include a phenyl group. Also, one in which two to four benzene rings form a fused ring, and one in which a benzene ring and an unsaturated five-membered ring form a fused ring may be included. Specific examples thereof include a naphthyl group, an anthryl group, a phenanthryl group, an indenyl group, an acenaphthenyl group, a fluorenyl group, and a pyrenyl group.

In addition, examples of the substituted or unsubstituted heteroaryl group represented by each of $R^{11}$ and $R^{12}$ include one in which one hydrogen atom on a heteroaromatic ring containing one or more hetero atoms selected from the group consisting of a nitrogen atom, an oxygen atom and a sulfur atom is eliminated to form a heteroaryl group. Specific examples of the heteroaromatic ring containing one or more hetero atoms selected from the group consisting of a nitrogen atom, an oxygen atom and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, and pteridine.

$R^{11}$ and $R^{12}$ may be linked to each other. In this case, it is preferable that $R^{11}$ and $R^{12}$ each independently represent an alkyl group or an aryl group, and these groups are linked to each other, and it is more preferable that $R^{11}$ and $R^{12}$ each independently represent an alkyl group and these groups are linked to each other.

The divalent linking group represented by $X^1$ preferably includes at least one linking group selected from —(C=O)O—, —O(C=O)—, —(C=O)NH—, —O—, —CO—, —NH—, —O(C=O)—NH—, —O(C=O)—O—, and —CH$_2$—, and the number of carbon atoms is preferably 7 or more.

$R^{11}$, $R^{12}$ and $X^1$ may be substituted by one or more substituents, if possible. As the substituent, a monovalent nonmetallic atomic group excluding a hydrogen atom can be exemplified and for example, the substituent is selected from the following substituent group Y.

Substituent group Y:

Halogen atom (—F, —Br, —Cl, —I), hydroxyl group, alkoxy group, aryloxy group, mercapto group, alkyl thio group, aryl thio group, alkyl dithio group, aryl dithio group, amino group, N-alkyl amino group, N,N-dialkyl amino group, N-aryl amino group, N,N-diaryl amino group, N-alkyl-N-aryl amino group, acyloxy group, carbamoyloxy group, N-alkylcarbamoyloxy group, N-aryl carbamoyloxy group, N,N-dialkyl carbamoyloxy group, N,N-diaryl carbamoyloxy group, N-alkyl-N-aryl carbamoyloxy group, alkyl sulfoxy group, aryl sulfoxy group, acyl thio group, acyl amino group, N-alkyl acyl amino group, N-aryl acyl amino group, ureido group, N'-alkyl ureido group, N',N'-dialkyl ureido group, N'-aryl ureido group, N',N'-diaryl ureido group, N'-alkyl-N'-aryl ureido group, N-alkyl ureido group, N-aryl ureido group, N'-alkyl-N-alkyl ureido group, N'-alkyl-N-aryl ureido group. N',N'-dialkyl-N-alkyl ureido group. N',N'-dialkyl-N-aryl ureido group, N'-aryl-N-alkyl ureido group, N'-aryl-N-aryl ureido group, N',N'-diaryl-N-alkyl ureido group, N',N'-diaryl-N-aryl ureido group, N'-alkyl-N'-aryl-N-alkyl ureido group, N'-alkyl-N'-aryl-N-aryl ureido group, alkoxy carbonyl amino group, aryloxy carbonyl amino group, N-alkyl-N-alkoxycarbonyl amino group, N-alkyl-N-aryloxy carbonyl amino group, N-aryl-N-alkoxycarbonyl amino group, N-aryl-N-aryloxycarbonyl amino group, formyl group, acyl group, carboxyl group and its conjugated basic group, alkoxy carbonyl group, aryloxy carbonyl group, carbamoyl group, N-alkyl carbamoyl group, N,N-dialkyl carbamoyl group, N-aryl carbamoyl group, N,N-diaryl carbamoyl group, N-alkyl-N-aryl carbamoyl group, alkyl sulfinyl group, aryl sulfinyl group, alkyl sulfonyl group, aryl sulfonyl group, sulfo group (—$SO_3H$) and its conjugated basic group, alkoxy sulfonyl group, aryloxy sulfonyl group, sulfinamoyl group, N-alkyl sulfinamoyl group, N,N-dialkyl sulfinamoyl group, N-aryl sulfinamoyl group, N,N-diaryl sulfinamoyl group, N-alkyl-N-aryl sulfinamoyl group, sulfamoyl group, N-alkyl sulfamoyl group. N,N-dialkyl sulfamoyl group, N-aryl sulfamoyl group, N,N-diaryl sulfamoyl group, N-alkyl-N-aryl sulfamoyl group, N-acyl sulfamoyl group and its conjugated basic group. N-alkyl sulfonyl sulfamoyl group (—$SO_2NHSO_2$(alkyl)) and its conjugated basic group, N-aryl sulfonyl sulfamoyl group (—$SO_2NHSO_2$(aryl)) and its conjugated basic group, N-alkyl sulfonyl carbamoyl group (—$CONHSO_2$(alkyl)) and its conjugated basic group. N-aryl sulfonyl carbamoyl group (—$CONHSO_2$(aryl)) and its conjugated basic group, alkoxy silyl group (—Si(Oalkyl)$_3$), aryloxy silyl group (—Si(Oaryl)$_3$), hydroxylyl group (—Si(OH)$_3$) and its conjugated basic group, pohsphono group (—$POH_2$) and its conjugated basic group, dialkyl phosphono group (—$PO_3$(alkyl)$_2$), diaryl phosphono group (—$PO_3$(aryl)$_2$), alkyl aryl phosphono group (—$PO_3$(alkyl)(aryl)), monoalkyl phosphono group (—$PO_3H$(alkyl)) and its conjugated basic group, monoaryl phosphono group (—$PO_3H$(aryl)) and its conjugated basic group, phosphonoxy group (—$OPO_3H_2$) and its conjugated basic group, dialkyl phosphonoxy group (—$OPO_3$(alkyl)$_2$), diaryl phosphonoxy group (—$OPO_3$(aryl)$_2$), alkyl aryl phosphonoxy group (—$OPO_3$(alkyl)(aryl)), monoalkyl phosphonoxy group (—$OPO_3H$(alkyl)) and its conjugated basic group, monoaryl phosphonoxy group (—$OPO_3H$(aryl)) and its conjugated basic group, cyano group, nitro group, aryl group, alkenyl group, and alkynyl group.

In addition, if possible, these substituents may be bonded to one another or to a substituted hydrocarbon group to form a ring.

It is preferable that $R^{11}$ and $R^{12}$ in Formula (II) each independently represent a hydrogen atom or an alkyl group or both represent an alkyl group and bonded to each other to form a ring. It is more preferable that $R^{11}$ and $R^{12}$ both represent a hydrogen atom or an alkyl group and bonded to each other to form a ring.

From the viewpoint of adhesiveness, it is preferable that the repeating unit represented by Formula (II) is a repeating unit represented by Formula (V). Improvement of adhesiveness by the repeating unit represented by Formula (V) is presumed to be due to the effect of bringing polarity closer to the adhesive layer having a hydroxyl group.

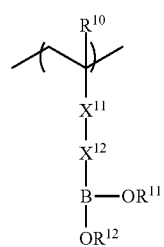

(V)

In Formula (V), $R^{10}$ represents a hydrogen atom or an alkyl group having 1 to 20 carbon atoms. $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group, and $R^{11}$ and $R^{12}$ may be linked to each other. $X^{11}$ represents a divalent linking group comprising at least one selected from the group consisting of —(C═O)O—, —O(C═O)—, —(C═O)NH—, —O—, —CO—, and —$CH_2$—. $X^{12}$ represents a divalent linking group including at least one linking group selected from —(C═O)O—, —O(C═O)—, —(C═O)NH—, —O—, —CO—, —NH—, —O(C═O)—NH—, —O(C═O)—O— and —$CH_2$— and including at least one substituted or unsubstituted aromatic ring. However, the total number of carbon atoms of $X^{11}$ and $X^{12}$ is 7 or more.

$X^{11}$ in Formula (V) is preferably —(C═O)O—, —O(C═O)—, or —(C═O)NH— and most preferably —(C═O)O—.

$X^{12}$ preferably contains 1 to 5 aromatic rings, more preferably contains 2 to 4 aromatic rings, and most preferably contains 2 to 3 aromatic rings.

The preferable range of each of $R^{10}$, $R^{11}$, and $R^{12}$ in Formula (V) is the same as the preferable range of each of $R^{10}$, $R^{11}$, and $R^{12}$ in Formula (II).

The repeating unit represented by Formula (II) or (V) is more preferably a repeating unit represented by Formula (VI).

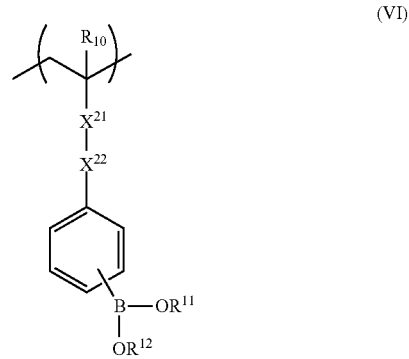

(VI)

In Formula (VI), $X^{21}$ represents —(C═O)O—, or —(C═O)NH—. $X^{22}$ represents a divalent linking group including at least one linking group selected from —(C═O)O—, —O(C═O)—. —(C═O)NH—, —O—, —CO—, —NH—, —O(C═O)—NH—, —O(C═O)—O—, and —$CH_2$—, and $X^{22}$ may include a substituted or unsubstituted aromatic ring.

The preferable range of each of $R^{10}$, $R^{11}$, and $R^{12}$ in Formula (VI) is the same as the preferable range of each of $R^{10}$, $R^{11}$, and $R^{12}$ in Formula (II).

The repeating unit represented by Formula (II), (V) or (VI) can be obtained by polymerizing a monomer. Specific examples of preferable monomers giving the repeating unit represented by Formula (II), (V) or (VI) are shown, but the present invention is not limited thereto.

II-1 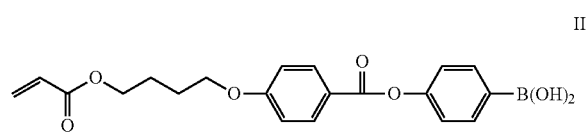
II-2 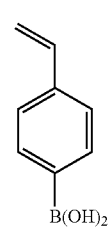
II-3 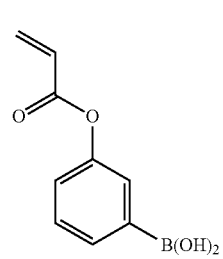
II-4 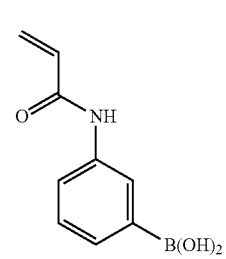
II-5 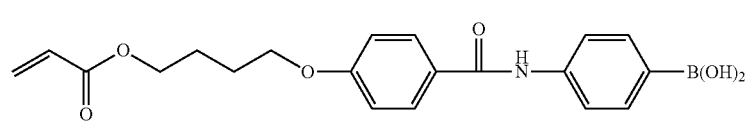
II-6 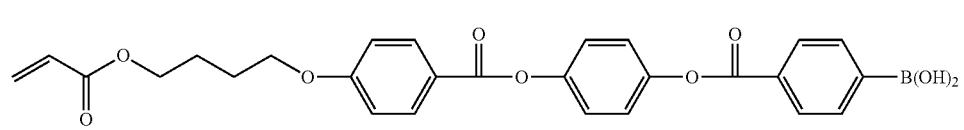
II-7 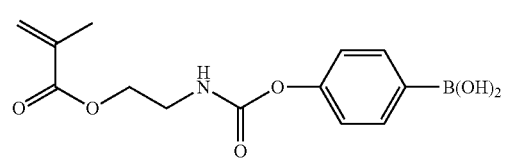
II-8 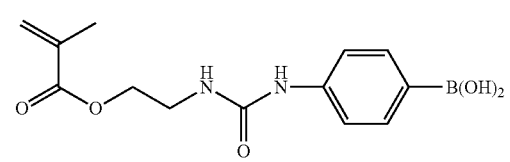
II-9 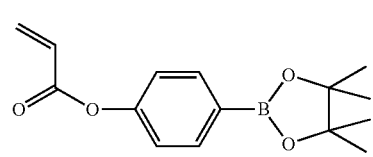
II-10 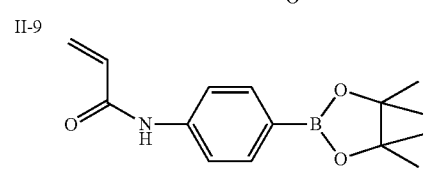
II-11 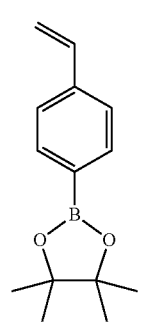
II-12 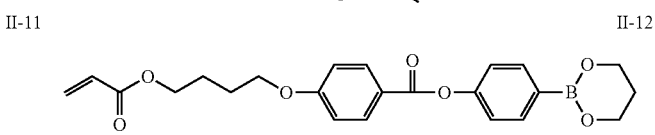

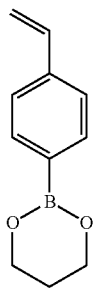

II-13

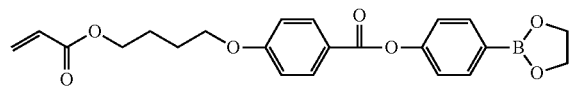

II-14

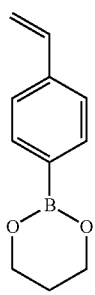

II-15

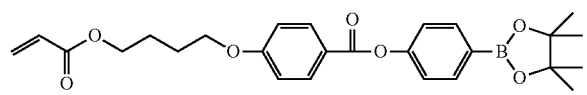

II-16

In addition, the copolymer (a) in the present invention may have repeating units (other repeating units) other than the repeating unit represented by Formula (I) and the repeating unit represented by Formula (II), if necessary.

As other kinds of monomers which give other repeating units, monomers described in Polymer Handbook 2nd ed., J. Brandrup, Wiley Interscience (1975) Chapter 2, Pages 1 to 483 can be used. For example, compounds having one addition polymerizable unsaturated bond selected from acrylic acid, methacrylic acid, acrylic acid esters, methacrylic acid esters, acrylamides, methacrylamides, allyl compounds, vinyl ethers, vinyl esters, dialkyl itaconates, dialkyl esters or monoalkyl esters of fumaric acid, and the like can be used.

Specific examples of monomers which give other repeating units include the following monomers.

Acrylic Acid Esters:

methyl acrylate, ethyl acrylate, propyl acrylate, chloroethyl acrylate, 2-hydroxyethyl acrylate, trimethylolpropane monoacrylate, benzyl acrylate, methoxybenzyl acrylate, phenoxyethyl acrylate, furfuryl acrylate, tetrahydrofurfuryl acrylate, 2-acryloyloxyethyl succinate, 2-carboxyethyl acrylate, and the like;

Methacrylic Acid Esters:

methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, phenoxyethyl methacrylate, furfuryl methacrylate, tetrahydrofurfuryl methacrylate, ethylene glycol monoacetoacetate monomethacrylate, 2-methacryloyloxyethyl phthalate, 2-methacryloyloxyethyl succinate, 2-methacryloyloxyethyl hexahydrophthalate, 2-carboxyethyl methacrylate, and the like:

Acrylamides:

acrylamide, N-alkyl acrylamide (as the alkyl group, an alkyl group having 1 to 3 carbon atoms, for example, a methyl group, an ethyl group, or a propyl group), N,N-dialkyl acrylamide (as the alkyl group, an alkyl group having 1 to 6 carbon atoms) N-hydroxyethyl-N-methylacrylamide, N-2-acetamidoethyl-N-acetylacrylamide, and the like;

Methacrylamides:

methacrylamide, N-alkyl methacrylamide (as the alkyl group, an alkyl group having 1 to 3 carbon atoms, for example, a methyl group, an ethyl group, or a propyl group), N, N-dialkyl methacrylamide (as the alkyl group, an alkyl group having 1 to 6 carbon atoms). N-hydroxyethyl-N-methylmethacrylamide. N-2-acetamidoethyl-N-acetyl methacrylamide, and the like;

Allyl Compounds:

allyl esters (for example, allyl acetate, allyl caproate, allyl caprylate, allyl laurate, allyl palmitate, allyl stearate, allyl benzoate, allyl acetoacetate, and allyl lactate), allyloxyethanol, and the like;

Vinyl Ethers:

alkyl vinyl ether (for example, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydro furfuryl vinyl ether, and the like);

Vinyl Esters:

vinyl acetate, vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl lactate, vinyl-β-phenylbutyrate, vinyl cyclohexylcarboxylate, and the like.

Dialkyl Itaconates:

dimethyl itaconate, diethyl itaconate, dibutyl itaconate, and the like;

Dialkyl esters or monoalkyl esters of fumaric acid: dibutyl fumalate and the like.

Examples of monomers which give other repeating units include crotonic acid, itaconic acid, acrylonitrile, methacrylonitrile, maleonitrile, styrene, 4-vinyl benzoic acid, styrene macromer (AS-6S manufactured by Toagosei Co., Ltd.), and methyl methacrylate macromer (AA-6 manufactured by Toagosei Co., Ltd.). In addition, it is also possible to convert the structure of the polymer after polymerization by polymer reaction.

Further, it is preferable that the copolymer (a) has a thermally crosslinking group. The thermally crosslinking group is a group that causes a crosslinking reaction by heating to conduct crosslinking, and specific examples thereof include a carboxyl group, an oxazoline group, a hydroxyl group, an isocyanate group, a maleimide group, an acetoacetoxy group, an epoxy group, and amino group. It is preferable that the copolymer (a) includes a repeating unit having a thermally crosslinking group.

In a case where the copolymer (a) of the present invention is contained in a functional film, it is particularly preferable that the copolymer is thermally crosslinked with other compounds included in the functional film, particularly, a styrene-based resin. Since the copolymer (a) and the styrene-based resin respectively have thermally crosslinking groups showing reactivity with each other, the copolymer (a) can be immobilized on the surface of the functional film and the functional film can exhibit higher adhesiveness with other layers, films, or other articles.

The content of the repeating unit represented by Formula (I) in the copolymer (a) is preferably 5% to 95% by mass, more preferably 8% to 90% by mass, and even more preferably 10% to 85% by mass with respect to the total mass of the copolymer (a).

The content of the repeating unit represented by Formula (II) in the copolymer (a) is preferably 0.5% to 80% by mass, more preferably 1% to 70% by mass, and even more preferably 2% to 60% by mass with respect to the total mass of the copolymer (a).

The content of the repeating unit having a thermally crosslinking group in the copolymer (a) is preferably 0.5% to 60% by mass, more preferably 1% to 50% by mass, and even more preferably 2% to 40% by mass with respect to the total mass of the copolymer (a).

The weight-average molecular weight (Mw) of the copolymer of the present invention is preferably 1000 to 200000, more preferably 1800 to 150000, even more preferably 2000 to 150000, particularly preferably 2500 to 140000, and highly preferably 20000 to 120000.

The number average molecular weight (Mn) of the copolymer of the present invention is preferably 500 to 160000, more preferably 600 to 120000, even more preferably 600 to 100000, particularly preferably 1000 to 80000, and highly preferably 2000 to 60000.

The distribution (Mw/Mn) of the copolymer of the present invention is preferably 1.00 to 18.00, more preferably 1.00 to 16.00, even more preferably 1.00 to 14.00, particularly preferably 1.00 to 12.00, and highly preferably 1.00 to 10.00.

The weight-average molecular weight and the number average molecular weight are values measured by gel permeation chromatography (GPC) under the following conditions.

[Eluent] N-methyl-2-pyrrolidone (NMP)
[Apparatus name] EcoSEC HLC-8320GPC (manufactured by Tosoh Corporation)
[Column] TSKgel Super AWM-H (manufactured by manufactured by Tosoh Corporation)
[Column temperature] 40° C.
[Flow rate] 0.50 ml/min The copolymer (a) can be synthesized by a known method.

Specific examples of the copolymer (a) will be shown below, but the present invention is not limited to these examples.

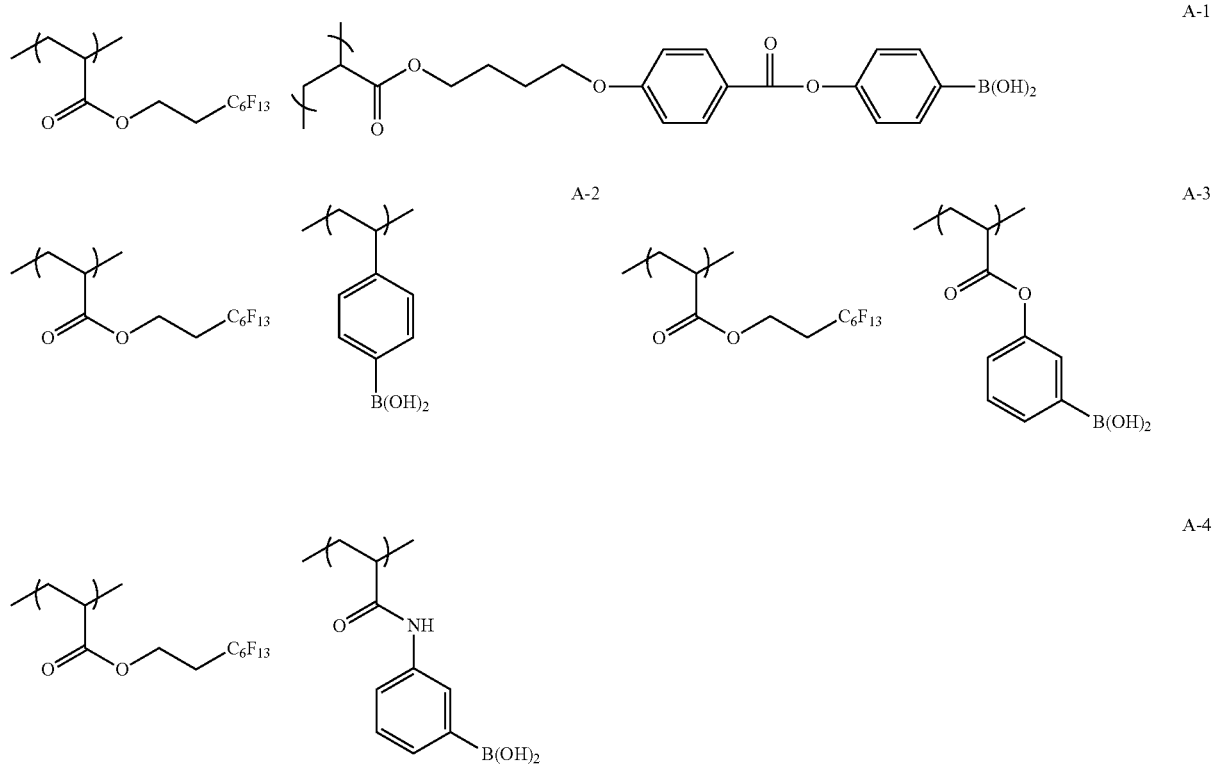

-continued
A-5
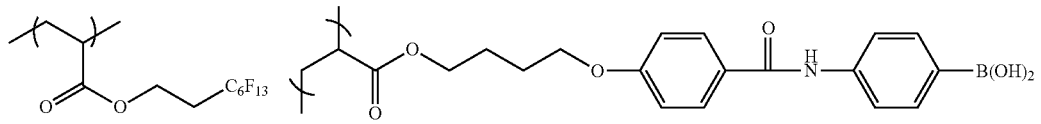
A-6
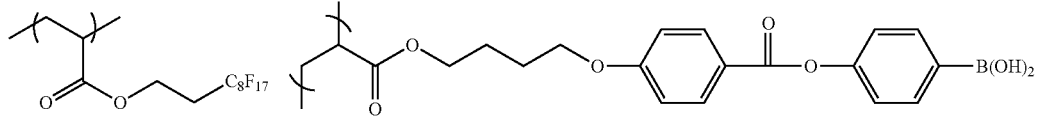
A-7
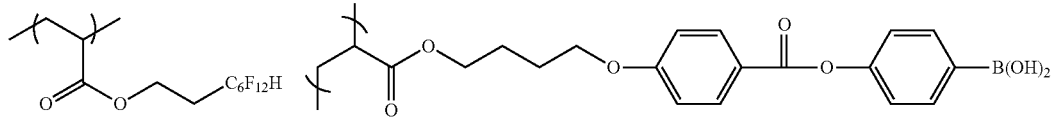
A-8
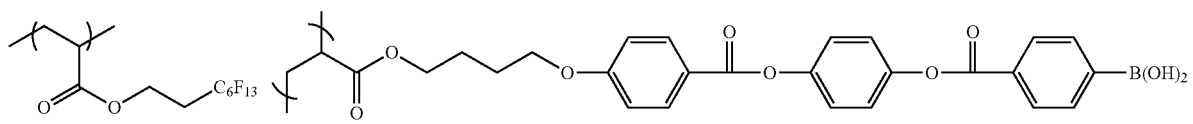
A-9
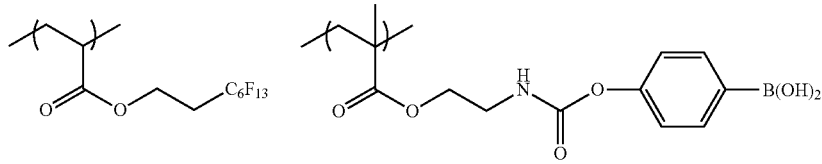
A-10
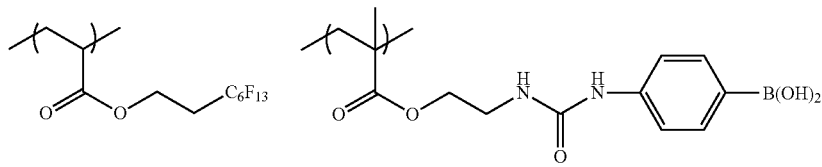
A-11
A-12
A-13
A-14
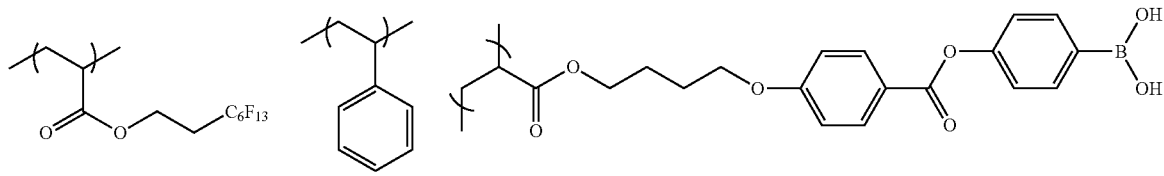

-continued
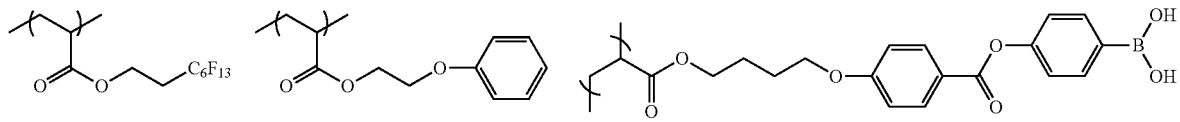
A-15
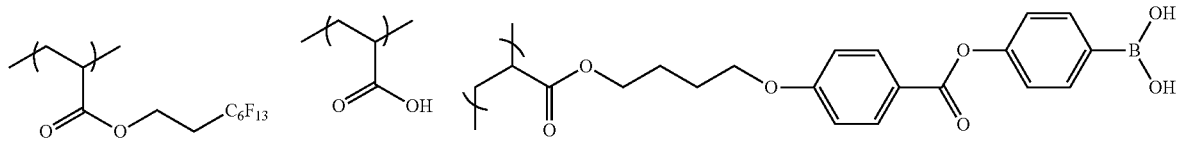
A-16
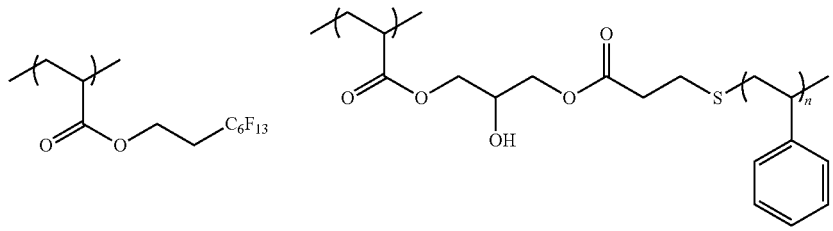
A-17
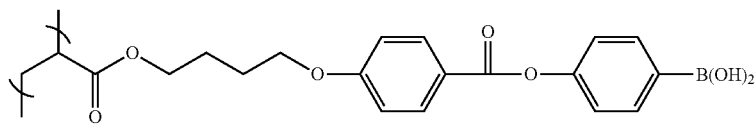
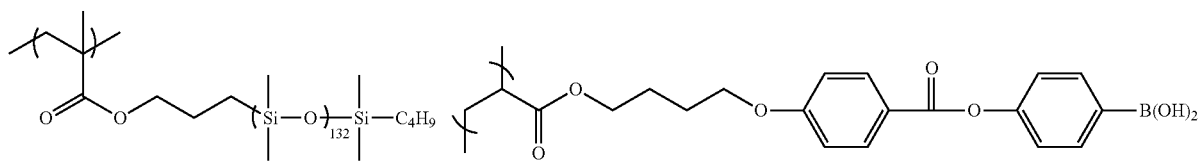
A-18
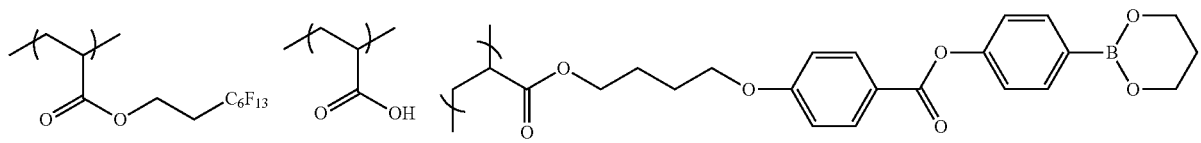
A-19
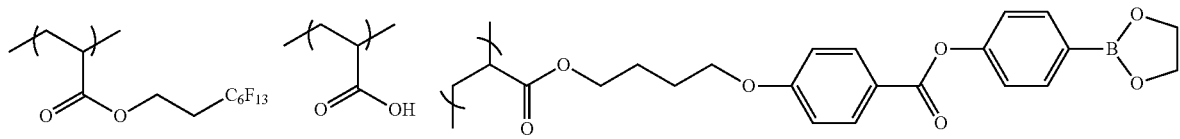
A-20
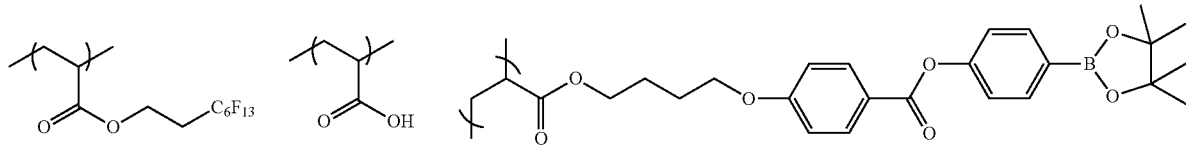
A-21
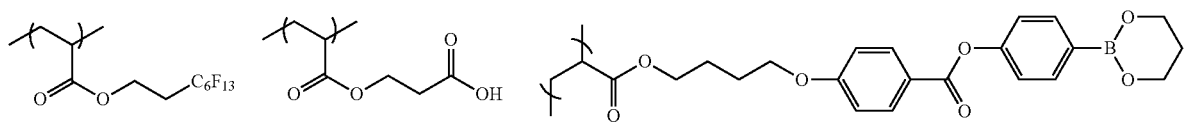
A-22

A-23
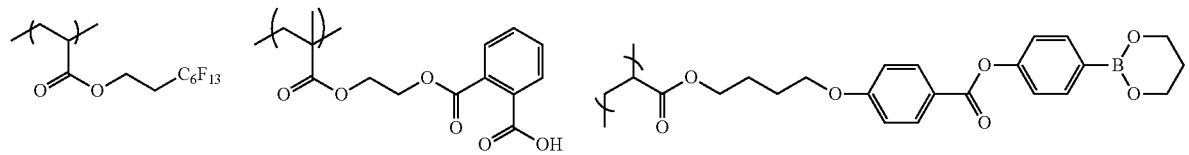
A-24
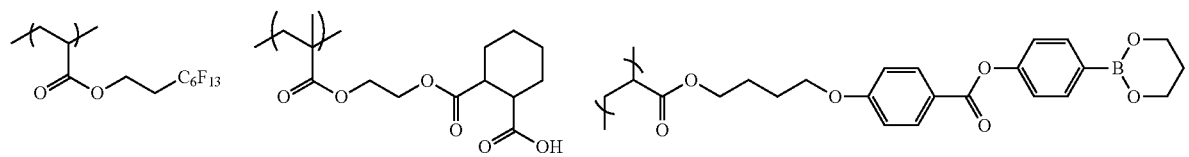
A-25
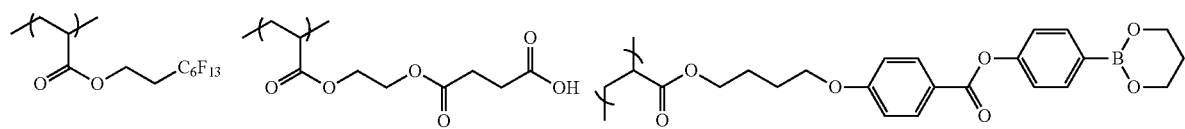
A-26
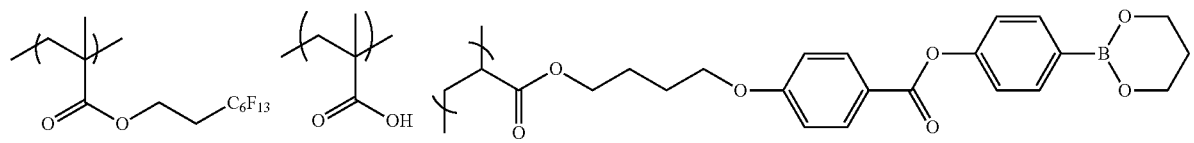
A-27
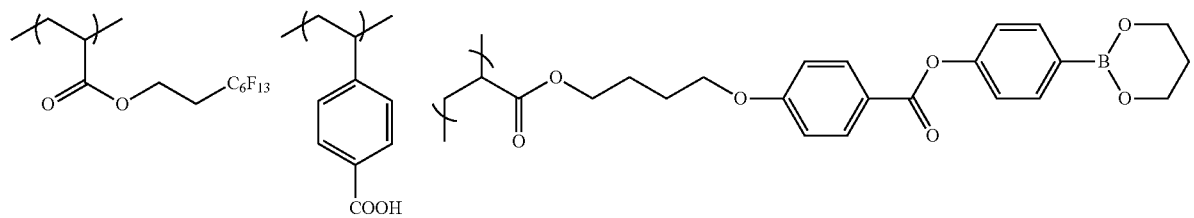
A-28
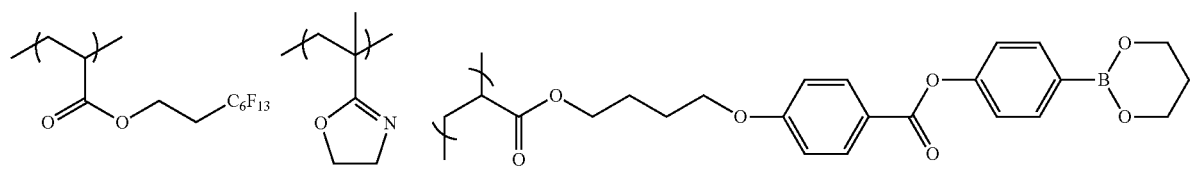
A-29
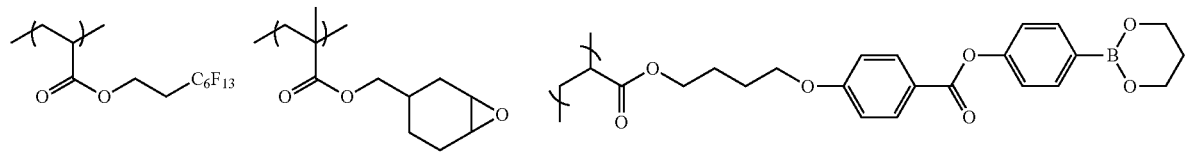
A-30
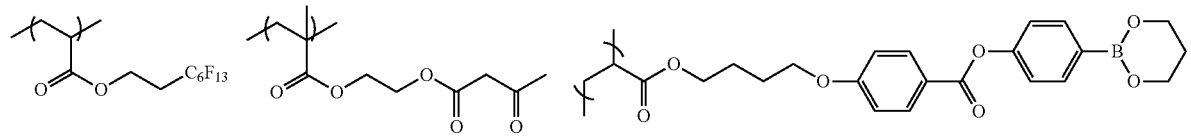

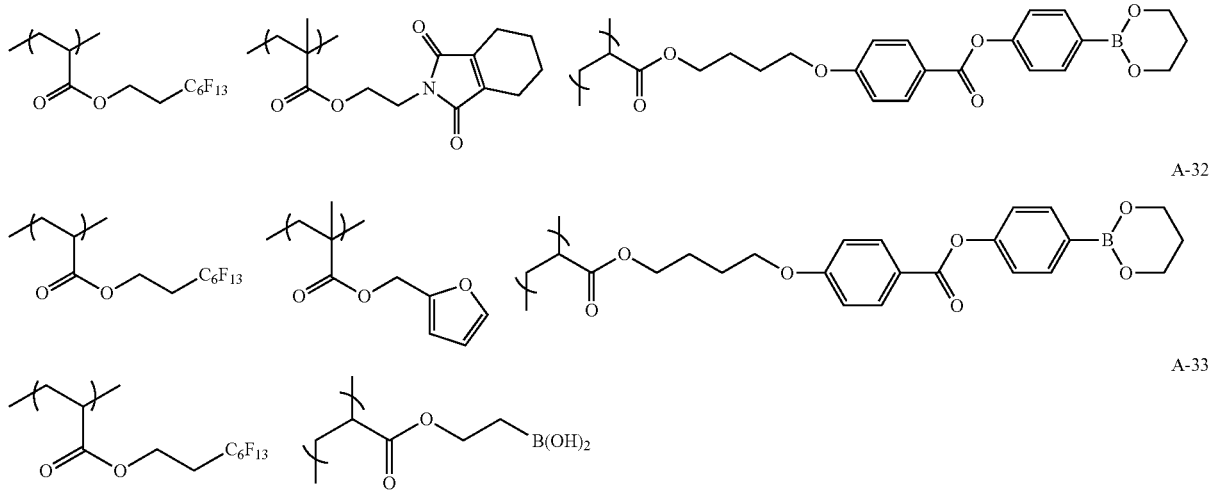

In a case where the copolymer (a) is contained in a functional film, from the viewpoint of enhancing the adhesion with the adhesive without impairing the function of the functional film, the content of the copolymer (a) is preferably 0.0001% to 40% by mass, more preferably 0.001% to 20%, by mass, and even more preferably 0.005% to 10% by mass, assuming that the total solid content (all components excluding the solvent) of the functional film is 100% by mass.

<Composition>

The present invention also relates to a composition containing the copolymer (a) (also referred to as "composition (a)"). It is preferable that the composition (a) contains a compound (monomer) having a reactive group in the molecule, such as a polymer resin, which will be described later, in addition to the copolymer (a).

<Functional Film>

Hereinafter, a functional film containing the copolymer (a) of the present invention will be described. It is preferable that the functional film containing the copolymer (a) is a functional film formed of the composition (a) containing the copolymer (a) (a composition for forming a functional film). More specifically, a functional film formed by applying the composition for forming a functional film on a substrate is preferable. The copolymer (a) may be a crosslinked reaction product in the functional film.

The functional film in the present invention may be any of a transparent film, an opaque film, and a colored film, but a transparent film is preferable. In addition, the transparent film may have a transmittance of 80% or more and a haze value of 5% or less. In addition, the functional film may be a film having a phase difference.

Specific examples of the functional film include a polarizer protective film (a polarizing plate protective film), a low moisture permeable film, an optically anisotropic film, and an optically isotropic film.

Since the functional film is particularly excellent in adhesiveness with a resin having a hydroxyl group, other layers, films, or other articles directly in contact with the functional film preferably includes a resin having a hydroxyl group. Examples of the resin having a hydroxyl group include polyvinyl alcohol-based resins, polyvinyl butyral resins, and bisphenol A type epoxy resins.

(Configuration of Functional Film)

The functional film may be a single film or may have a laminated structure of two or more layers.

(Film Thickness)

The film thickness of the functional film in the present invention is preferably 0.1 to 30 μm, more preferably 0.2 to 20 μm, and even more preferably 0.4 to 10 m. By setting the film thickness to 0.1 μm or more or more, it becomes possible to secure processing suitability and durability in a case of lamination on a polarizer, and a film thickness of 30 μm or less is preferable from the viewpoint of being capable of reducing the thickness of a polarizing plate. In addition, in a case where the functional film is mounted on a liquid crystal display device, the effect of reducing light unevenness of the liquid crystal display device due to environmental change and the effect of reducing warping of the liquid crystal panel due to temperature and humidity change can be expected, and thus the film thickness is preferable.

(Equilibrium Moisture Absorptivity)

The equilibrium moisture absorptivity of the functional film is preferably 2.0% by mass or less and more preferably 1.0% by mass or less under the conditions of a temperature of 25° C. and a relative humidity of 80% regardless of film thickness from the viewpoint of durability in a case of lamination on a polarizer. A case where the equilibrium moisture absorptivity is 2.0% by mass or less is preferable from the viewpoint of suppressing mixing of hydrophilic components to deteriorate the durability of a polarizer.

In the present specification, the equilibrium moisture absorptivity of the functional film can be measured using a sample whose film thickness is increased if necessary. The equilibrium moisture absorptivity can be measured by humidity-conditioning a sample for 24 hours or longer, then measuring a moisture content (g) by the Karl Fischer method with a moisture measuring instrument and a sample drying apparatus "CA-03" and "VA-05" {both manufactured by Mitsubishi Chemical Corporation}, and dividing the moisture content (g) by the sample mass (g).

(Other Materials Constituting Functional Film)

As other materials constituting the functional film of the present invention, in addition to the copolymer (a), a cured product derived from a compound (monomer) having a reactive group in the molecule and/or a polymer resin can be suitably used.

(Cured Product Derived from Compound Having Reactive Group in Molecule)

The functional film preferably contains a cured product derived from a compound (monomer) having a reactive group in the molecule. The compound having a reactive group in the molecule is referred to as "compound (b)". The number of reactive groups in the molecule of the compound (b) is more preferably 2 or more and even more preferably 3 or more from the viewpoint that the compound can be three-dimensionally intertwined with copolymer (a) and immobilized.

In addition, the reactive group is particularly preferably an ethylenically unsaturated double bond-containing group.

Further, from the viewpoint of controlling peelability between the functional film and the substrate, as the compound (b), a compound having an ethylenically unsaturated double bond-containing group and a cyclic aliphatic hydrocarbon group is preferable.

<<Compound Having Group Having Ethylenically Unsaturated Double Bond and Cyclic Aliphatic Hydrocarbon Group>>

The cyclic aliphatic hydrocarbon group is preferably a group derived from an alicyclic compound having 7 or more carbon atoms, more preferably a group derived from an alicyclic compound having 10 or more carbon atoms, and even more preferably a group derived from an alicyclic compound having 12 or more carbon atoms.

The cyclic aliphatic hydrocarbon group is particularly preferably a group derived from a polycyclic compound such as a bicyclic or tricyclic compound.

More preferable are center skeleton of a compound disclosed in claims of JP2006-215096A, a center skeleton of a compound disclosed in JP2001-010999A, a skeleton of an adamantane derivative and the like.

Specific examples of the cyclic aliphatic hydrocarbon group include a norbornane group, a tricyclodecane group, a tetracyclododecane group, a pentacyclopentadecane group, an adamantane group, and a diamantane group.

The cyclic aliphatic hydrocarbon group (including a linking group) is preferably a group represented by any one of Formulae (A) to (E), more preferably a group represented by Formula (A), (B) or (D), even more preferably a group represented by Formula (A).

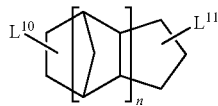

(A)

In Formula (A), $L^{10}$ and $L^{11}$ each independently represent a single bond or a divalent or higher valent linking group. n represents an integer of 1 to 3.

The cyclic aliphatic hydrocarbon group and an ethylenically unsaturated double bond-containing group are bonded through $L^{10}$ and $L^{11}$.

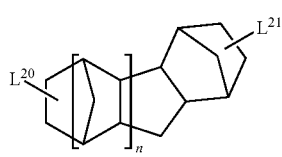

(B)

In Formula (B), $L^{20}$ and $L^{21}$ each independently represent a single bond or a divalent or higher valent linking group. n represents an integer of 1 or 2.

The cyclic aliphatic hydrocarbon group and an ethylenically unsaturated double bond-containing group are bonded through $L^{20}$ and $L^{21}$.

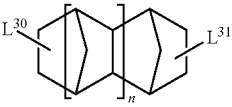

(C)

In Formula (C), $L^{30}$ and $L^{31}$ each independently represent a single bond or a divalent or higher valent linking group. n represents an integer of 1 or 2.

The cyclic aliphatic hydrocarbon group and an ethylenically unsaturated double bond-containing group are bonded through $L^{30}$ and $L^{31}$.

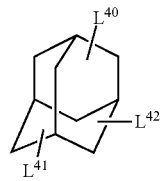

(D)

In Formula (D), $L^{40}$ and $L^{41}$ each independently represent a single bond or a divalent or higher valent linking group. $L^{42}$ represents a hydrogen atom, a single bond, or a divalent or higher valent linking group.

The cyclic aliphatic hydrocarbon group and an ethylenically unsaturated double bond-containing group are bonded through $L^{40}$ and $L^{41}$. In a case where $L^{42}$ represents a single bond, or a divalent or higher valent linking group, the cyclic aliphatic hydrocarbon group and an ethylenically unsaturated double bond-containing group are bonded through $L^{42}$.

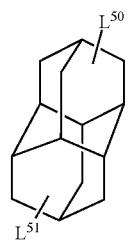

(E)

In Formula (E), $L^{50}$ and $L^{51}$ each independently represent a single bond or a divalent or higher valent linking group.

The cyclic aliphatic hydrocarbon group and an ethylenically unsaturated double bond-containing group are bonded through $L^{50}$ and $L^{51}$.

In Formulae (A) to (E), the divalent or higher valent linking group represented by $L^{10}$, $L^{11}$, $L^{20}$, $L^{21}$, $L^{30}$, $L^{31}$, $L^{40}$, $L^{41}$, $L^{42}$, $L^{50}$, and $L^{51}$ includes an alkylene group having 1 to 6 carbon atoms, which may be substituted, an amide group which may be substituted at the N-position, a carbamoyl group which may be substituted at the N-position, an ester group, an oxycarbonyl group, an ether group, and a group formed by combining two or more groups thereof.

The ethylenically unsaturated double bond-containing group includes a polymerizable functional group such as (meth)acryloyl group, vinyl group, styryl group and allyl group, and among these, a (meth)acryloyl group and —C(O)OCH=CH$_2$ are preferable. More preferably, the following compound containing two or more (meth)acryloyl groups in one molecule can be used. Particularly preferably, the following compound containing three or more (meth)acryloyl groups in one molecule can be used.

The compound having a cyclic aliphatic hydrocarbon group and containing two or more ethylenically unsaturated double bonds in the molecule is constituted by bonding the cyclic aliphatic hydrocarbon group to an ethylenically unsaturated double bond-containing group through a linking group.

Such a compound can be easily synthesized, for example, by a one-step or two-step reaction of a polyol, such as diol or triol, having the cyclic aliphatic hydrocarbon group, with a carboxylic acid, a carboxylic acid derivative, an epoxy derivative, an isocyanate derivative, or the like, of a compound having a (meth)acryloyl group, a vinyl group, a styryl group, an allyl group, or the like.

Preferably, the above compound may be synthesized through the reaction with a polyol having the cyclic aliphatic hydrocarbon group by using a compound such as (meth)acrylic acid, (meth)acryloyl chloride, (meth)acrylic anhydride and glycidyl (meth)acrylate, or a compound described in WO2012/000316A (for example, 1,1-bis(acryloyloxymethyl)ethyl isocyanate).

Preferable specific examples of the compound having an ethylenically unsaturated double bond-containing group and a cyclic aliphatic hydrocarbon group are shown below, but the present invention is not limited to these examples.

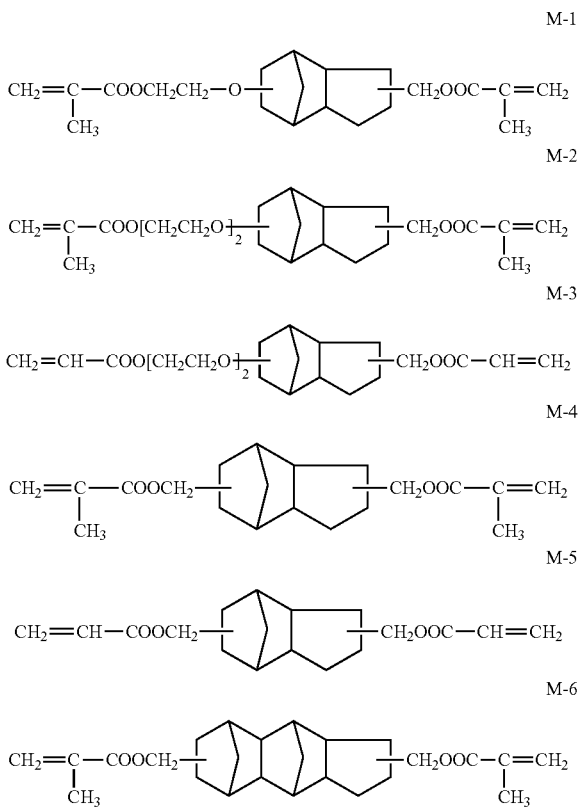

In a case where the functional film contains the compound (b) and a cured product thereof, the content of the compound (b) and the cured product thereof is preferably 5% to 99.9% by mass and more preferably 10% to 90% by mass, assuming that the total solid content (all components excluding the solvent) of the functional film is 100 mass %.

(Polymerization Initiator)

In a case where the composition (a) (the composition for forming a functional film) is a composition containing the compound having an ethylenically unsaturated double bond-containing group in the molecule and a cyclic aliphatic hydrocarbon group, it is preferable that the composition (a) includes a polymerization initiator. The polymerization initiator is preferably a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins. Specific examples, preferred aspects, commercially available products and the like of the photopolymerization initiator are described in paragraphs [0133] to [0151] of JP2009-098658A, and these may be suitably used likewise in the present invention.

Various examples of the photopolymerization initiator are described also in "Latest UV Curing Technology" {Technical Information Institute Co., Ltd.} (1991), p. 159 and "Ultraviolet Ray Curing System" written by Kiyomi Kato (1989, published by United Engineering Center). pp. 65-148, and these are useful for the present invention.

Preferable examples of commercially available photoradical polymerization initiators of photocleavage type include "IRGACURE 651", "IRGACURE 184", "IRGACURE 819", "IRGACURE 907", "IRGACURE 1870" (a mixed initiator of CGI-403/IRGACURE 184=7/3), "IRGACURE 500", "IRGACURE 369", "IRGACURE 1173", "IRGACURE 2959", "IRGACURE 4265", "IRGACURE 4263", "IRGACURE 127". "OXE01", and the like, manufactured by BASF (former Ciba Specialty Chemicals Inc.); "KAYACURE DETX-S", "KAYACURE BP-100", "KAYACURE BDMK", "KAYACURE CTX", "KAYACURE BMS", "KAYACURE 2-EAQ", "KAYACURE ABQ", "KAYACURE CPTX", "KAYACURE EPD", "KAYACURE ITX", "KAYACURE QTX", "KAYACURE BTC", "KAYACURE MCA", and the like, manufactured by Nippon Kayaku Co., Ltd.; "ESACURE (KIP100F, KB1, EB3, BP, X33, KTO46, KT37, KIP150, and TZT)", and the like, manufactured by Sartomer Company Inc.; and a combination thereof.

In a case where the composition (a) (the composition for forming a functional film) is a composition containing the compound having an ethylenically unsaturated double bond-containing group in the molecule and a cyclic aliphatic hydrocarbon group, it is preferable that the content of the photopolymerization initiator in the composition is preferably 0.5% to 8% by mass and more preferably 1% to 5% by mass with respect to the total solid content in the composition (a) for the reason that the content is set to polymerize a polymerizable compound included in the composition (a) and prevent an excessive increase of the initiation site.

(Polymer Resin)

The functional film may include a polymer resin (hereinafter, also referred to as "resin (d)"), in addition to the copolymer (a) and/or the crosslinked reaction product derived from the copolymer. From the viewpoint of improving brittleness resistance and modulus of elasticity, it is preferable that the resin includes, for example, a polar structure capable of strengthening the interaction between the polymer molecules. Specific examples thereof include aromatic vinyl-based resin (preferably styrene-based resin), cellulose-based resin (cellulose acylate resin, cellulose ether resin, or the like), cyclic olefin-based resin, polyester-based resin, polycarbonate-based resin, vinyl-based resin other than aromatic vinyl-based resin, polyimide-based resin, and polyarylate-based resin, and aromatic vinyl-based resin and cyclic olefin resin are preferable from the viewpoint of hygroscopicity and moisture permeability.

The aromatic vinyl-based resin is a vinyl-based resin including at least one aromatic ring, and examples thereof include styrene-based resin, divinylbenzene-based resin, 1,1-diphenyl styrene-based resin, vinylnaphthalene-based resin, vinylanthracene-based resin, N, N-diethyl-p-aminoethylstyrene-based resin, and vinylpyridine-based resin, and as the copolymerization component, a vinylpyridine unit, a vinylpyrrolidone unit, a maleic acid anhydride unit, and the like may be appropriately included. Among the aromatic vinyl-based resins, from the viewpoint of controlling the photoelastic coefficient and hygroscopicity, it is preferable that the functional film includes a styrene-based resin.

One of these resins (d) may be used alone, or two or more thereof may be used in combination.

<<Styrene-Based Resin>>

As an example of the styrene-based resin, a resin including 50% by mass or more of a repeating unit derived from a styrene-based monomer is exemplified. Here, the styrene-based monomer means a monomer having a styrene skeleton in its structure.

Specific examples of the styrene-based monomer include styrene or a derivative thereof. Here, the styrene derivative is a compound prepared by bonding styrene with another group, and examples thereof include alkylstyrene such as o-methylstyrene, m-methylstyrene, p-methylstyrene, 2,4-dimethylstyrene, o-ethylstyrene, or p-ethylstyrene, and substituted styrene having a hydroxyl group, an alkoxy group, a carboxyl group, or a halogen introduced into the benzene nucleus of styrene, such as hydroxystyrene, tert-butoxystyrene, vinyl benzoic acid, o-chlorostyrene and p-chlorostyrene.

The styrene-based resin may be a homopolymer of styrene or a derivative thereof, and in addition to this, a copolymer obtained by copolymerizing a styrene-based monomer component with another monomer component is also included. Examples of the copolymerizable monomer include unsaturated carboxylic acid alkyl ester monomers including alkyl methacrylates such as methyl methacrylate, cyclohexyl methacrylate, methylphenyl methacrylate, and isopropyl methacrylate; and alkyl acrylates such as methyl acrylate, ethyl acrylate, butyl acrylate, 2-ethylhexyl acrylate, and cyclohexyl acrylate, unsaturated carboxylic acid monomers such as such as methacrylic acid, acrylic acid, itaconic acid, maleic acid, fumaric acid, and cinnamic acid, unsaturated dicarboxylic acid anhydride monomers as anhydrides of maleic acid, itaconic acid, ethylmaleic acid, methyl itaconic acid, chloromaleic acid, and the like, unsaturated nitrile monomers such as acrylonitrile, and methacrylonitrile, and conjugated dienes such as 1,3-butadiene, 2-methyl-1,3-butadiene (isoprene), 2,3-dimethyl-1,3-butadiene, 1,3-pentadiene, and 1,3-hexadiene, and two or more of these can be copolymerized.

The styrene-based resin is preferably a copolymer of styrene or a styrene derivative and at least one monomer selected from acrylonitrile, maleic acid anhydride, methyl methacrylate and 1,3-butadiene.

The polystyrene-based resin is not particularly limited and examples thereof include a homopolymer of a styrene-based monomer such as general purpose polystyrene (GPPS) which is a homopolymer of styrene; a copolymer constituted only of two or more kinds of styrene-based monomers as a monomer component; a styrene-diene-based copolymer; a copolymer such as a styrene-polymerizable unsaturated carboxylic acid ester-based copolymer; a mixture of polystyrene and synthetic rubber (for example, polybutadiene, polyisoprene, or the like); high impact polystyrene (HIPS) such as polystyrene obtained by graft-polymerizing styrene to synthetic rubber; a polystyrene obtained by dispersing a rubbery elastomer in a continuous phase of a polymer containing a styrene-based monomer (for example, a copolymer of a styrene-based monomer and a (meth)acrylate ester-based monomer) and graft-polymerizing the copolymer with the rubbery elastomer (also referred to as graft type high impact polystyrene, "graft HIPS"); and a styrene-based elastomer.

In addition, the polystyrene-based resin is not particularly limited and may be hydrogenated. That is, the polystyrene-based resin may be a polystyrene-based resin to which hydrogen is added (hydrogenated polystyrene-based resin). Although the hydrogenated polystyrene-based resin is not particularly limited, the hydrogenated polystyrene-based resin is preferably a hydrogenated styrene-diene-based copolymer such as a hydrogenated styrene-butadiene-styrene block copolymer (SEBS) or hydrogenated styrene-isoprene-styrene block copolymer (SEPS) which is a resin obtained by adding hydrogen to SBS or SIS. Only one of these hydrogenated polystyrene-based resins may be used, or two or more thereof may be used.

In addition, the polystyrene-based resin is not particularly limited and a polar group may be introduced thereinto. That is, the polystyrene-based resin may be a polystyrene-based resin with a polar group introduced therein (modified polystyrene-based resin). The modified polystyrene-based resin includes a hydrogenated polystyrene-based resin with a polar group introduced therein.

The modified polystyrene-based resin is a polystyrene-based resin having a polystyrene-based resin as a main chain skeleton and having a polar group introduced therein. The polar group is not particularly limited and examples thereof include an acid anhydride group, a carboxylic acid group, a carboxylic acid ester group, a carboxylic acid chloride group, a carboxylic acid amide group, a carboxylate group, a sulfonic acid group, a sulfonic acid ester group, a sulfonic acid chloride group, a sulfonic acid amide group, a sulfonate group, an isocyanate group, an epoxy group, an amino group, an imide group, an oxazoline group, and a hydroxyl group. Among these, an acid anhydride group, a carboxylic acid group, a carboxylic acid ester group, and an epoxy group are preferable and a maleic acid anhydride group and an epoxy group are more preferable. Only one of these polar groups may be used, or two or more thereof may be used. Since the modified polystyrene-based resin has a polar group having high affinity or reactable with the polyester-based resin and is compatible with the polystyrene-based resin, the adhesiveness with a layer having a polyester-based resin as a main component (for example, a surface layer or a layer B) or a layer having a polystyrene-based resin as a main component (for example, another layer A) at room temperature is increased. Only one of these polar groups may be used, or two or more thereof may be used.

The modified polystyrene-based resin is not particularly limited and a modified product of a hydrogenated styrene-butadiene-styrene block copolymer (SEBS) and a modified product of a hydrogenated styrene-propylene-styrene block copolymer (SEPS) are preferable. That is, although the modified polystyrene-based resin is not particularly limited, acid anhydride modified SEBS, acid anhydride modified SEPS, epoxy modified SEBS, and epoxy modified SEPS are preferable, and maleic acid anhydride modified SEBS, maleic acid anhydride modified SEPS, epoxy modified SEBS, and epoxy modified SEPS are more preferable. Only one of these modified polystyrene-based resins may be used, or two or more thereof may be used.

As the styrene-based resin that can be suitably used in the present invention, for the reason of high heat resistance, polystyrene, a styrene/acrylonitrile copolymer, a styrene/methacrylic acid copolymer, and a styrene/maleic acid anhydride copolymer may be used.

Since a styrene/acrylonitrile copolymer, a styrene/methacrylic acid copolymer, and a styrene/maleic acid anhydride copolymer exhibit high compatibility with an acrylic resin, these copolymers are preferable from the viewpoint of obtaining a film which has high transparency and not causing phase separation during use without lowering transparency. From this viewpoint, these copolymers are preferable particularly in a case where a polymer containing methyl methacrylate as a monomer component is used as an acrylic resin.

In a case of a styrene-acrylonitrile copolymer, the copolymer ratio of acrylonitrile in the copolymer is preferably 1% to 40% by mass. A more preferable range is 1% to 30% by mass and a particularly preferable range is 1% to 25% by mass. A case where the copolymer ratio of acrylonitrile in the copolymer is 1% by mass to 40% by mass is preferable since the transparency is excellent.

In a case of a styrene-methacrylic acid copolymer, the copolymer ratio of methacrylic acid in the copolymer is preferably 0.1% to 50% by mass. A more preferable range is 0.1% to 40% by mass and a particularly preferable range is 0.1% to 30% by mass. In a case where the copolymer ratio of methacrylic acid in the copolymer is 0.1% by mass or more, the heat resistance is excellent and in a case where the ratio is in a range of 50% by mass or less, the transparency is excellent. Thus, this copolymer ratio range is preferable.

In a case of a styrene/maleic acid anhydride copolymer, the copolymer ratio of maleic acid anhydride in the copolymer is preferably 0.1% to 50% by mass. A more preferable range is 0.1% to 40% by mass and a particularly preferable range is 0.1% to 30% by mass. In a case where the copolymer ratio of maleic acid anhydride in the copolymer is 0.1% by mass or more, the heat resistance is excellent and in a case where the ratio is in a range of 50% by mass or less, the transparency is excellent. Thus, this copolymer ratio range is preferable.

Among these, from the viewpoint of heat resistance, polystyrene, a styrene-methacrylic acid copolymer, and a styrene-maleic acid anhydride copolymer are particularly preferable.

In addition, from the viewpoint of the adhesiveness between the functional film and other layers, films, or other articles, the most suitably used styrene-based resin is a styrene-based resin having a thermally crosslinking group, and the styrene-based resin preferably contains a repeating unit having a thermally crosslinking group. The thermally crosslinking group is the same as the thermally crosslinking group described in the above-described copolymer (a). In a case where the styrene-based resin has a thermally crosslinking group and the copolymer (a) has a thermally crosslinking group, the copolymer (a) can be immobilized on the surface of the functional film and higher adhesiveness can be exhibited. In this case, since it is possible to immobilize the copolymer (a) on the surface of the functional film by reacting the thermally crosslinking group by heating, the above-described process in which a compound (monomer) having a reactive group in the molecule is incorporated and the monomer is cured by ionizing radiation irradiation with ultraviolet rays or the like so as to immobilize the copolymer (a) on the surface of the functional film is not required and thus this case is preferable.

Hereinafter, specific examples of the styrene-based resin having a thermally crosslinking group are listed, but the present invention is not limited to these examples.

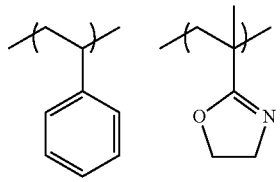

B-1

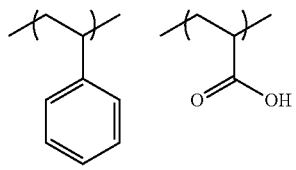

B-2

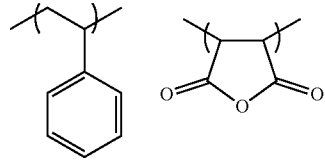

B-3

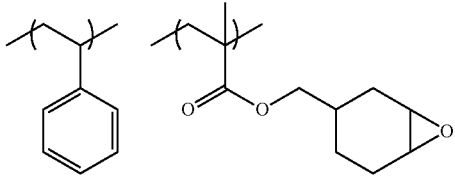

B-4

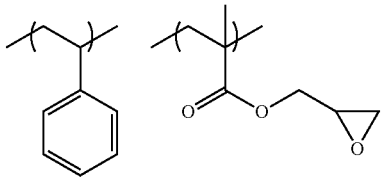

B-5

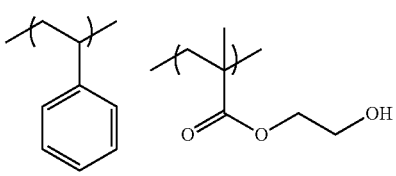

B-6

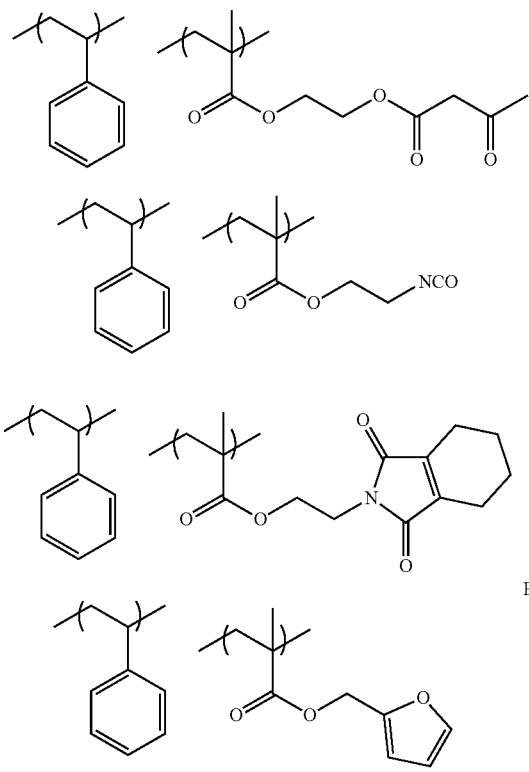

One styrene-based resin may be used alone or a plurality of kinds of styrene-based resins having different repeating unit compositions, molecular weights, and the like may be used in combination.

The styrene-based resin can be obtained by a known anion, bulk, suspension, emulsion or solution polymerization method. In addition, in the styrene-based resin, the unsaturated double bond of the benzene ring of the conjugated diene or the styrene-based monomer may be hydrogenated. The hydrogenation rate can be measured by a nuclear magnetic resonance apparatus (NMR).

<<Cyclic Olefin-Based Resin>>

In a case where a cyclic olefin-based resin is used as a material constituting the functional film, for example, a thermoplastic resin having a unit of a monomer constituted of a cyclic olefin such as norbornene or polycyclic norbornene-based monomer may be used and is also referred to as a thermoplastic cyclic olefin-based resin. The thermoplastic cyclic olefin-based resin may be a ring-opened polymer of the cyclic olefin or a hydrogenated product of a ring-opened copolymer using two or more cyclic olefins and may be an addition polymer of a cyclic olefin and a chain olefin and an aromatic compound having a polymerizable double bond such as a vinyl group. The cyclic olefin-based resin may have a polar group introduced therein.

In a case where a copolymer of a cyclic olefin and a chain olefin and/or an aromatic compound having a vinyl group is used as the material for the functional film, as the chain olefin, ethylene, propylene, and the like may be used, and as the aromatic compound having a vinyl group, styrene, α-methylstyrene, nuclear alkyl-substituted styrene, and the like may be used. In such a copolymer, the unit of the monomer constituted of the cyclic olefin is preferably 50% by mol or less, and more preferably about 15% to 50% by mol. Particularly, a ternary copolymer of a cyclic olefin, a chain olefin, and an aromatic compound having a vinyl group is used as the material for the functional film, the unit of the monomer constituted of the cyclic olefin can be reduced to a relatively small amount as described above. In the ternary copolymer, the unit of the monomer constituted of the chain olefin is typically 5% to 80% by mol, and the unit of the monomer constituted of the aromatic compound having a vinyl group is typically 5% to 80% by mol.

As the cyclic olefin-based resin, any suitable commercially available product can be used, and examples thereof include "TOPAS" manufactured by TOPAS ADVANCED POLYMERS GmbH in Germany and available from Polyplastics Co. Ltd. in Japan, "ARTON" available from JSR Corporation, "ZEONOR" and "ZEONEX" available from Zeon Corporation, and "APEL" available from Mitsui Chemicals Inc. (all trade names).

<<Cellulose Acylate Resin>>

In a case where a cellulose acylate resin is used as a material constituting the functional film, for example, cellulose acetate, cellulose acetate propionate, cellulose propionate, cellulose acetate butyrate, cellulose acetate propionate butyrate, cellulose acetate benzoate, and the like may be used. Among these, cellulose acetate, and cellulose acetate propionate are preferable.

<<Polycarbonate-Based Resin>>

In a case where a polycarbonate-based resin is used as a material constituting the functional film, for example, polycarbonate, a polycarbonate containing a structural unit in which bisphenol A is fluorene-modified, a polycarbonate containing a structural unit in which bisphenol A is modified with 1,3-cyclohexylidene, and the like may be used.

<<Vinyl-Based Resin Other than Aromatic Vinyl-Based Resin>>

In a case where a vinyl-based resin other than the aromatic vinyl-based resin is used as a material constituting the functional film, for example, polyethylene, polypropylene, polyvinylidene chloride, polyvinyl alcohol, and the like may be used.

(Weight-Average Molecular Weight of Resin (d))

The weight-average molecular weight (Mw) of the resin (d) is not particularly limited and is preferably 5,000 to 800,000, more preferably 100,000 to 600,000, and even more preferably 120,000) to 400,000.

The weight-average molecular weight of the resin (d) is obtained by measuring weight-average molecular weight (Mw) in terms of standard polystyrene and molecular weight distribution (Mw/Mn) under the following conditions. Mn is number average molecular weight in terms of standard polystyrene.

GPC: gel permeation chromatograph apparatus (HLC-8220GPC, manufactured by Tosoh Corporation, column; guard columns HXL-H, TSK gel G7000HXL, two columns of TSK gel GMHXL, TSK gel G2000HXL, manufactured by Tosoh Corporation, sequentially link together, eluent; tetrahydrofuran, flow rate; 1 mL/min, sample concentration; 0.7% to 0.8% by mass, sample injection amount; 70 μL, measurement temperature; 40° C., detector; differential refractometer (RI) meter (40° C.), standard substance; TSK standard polystyrene manufactured by Tosoh Corporation)

In a case where the functional film contains the resin (d), one resin (d) may be contained or two or more resins (d) may be used. In addition, in a case where the functional film is formed of a plurality of layers, the resins (d) included in each layer may be different from each other.

(Content of Resin (d) in Functional Film)

The content of the resin (d) in the functional film is preferably 5% to 99.99% by mass and more preferably 10% to 99.9% by mass, assuming that the total solid content (all components excluding the solvent) of the functional film is 100% by mass.

(Solvent)

The composition for forming a functional film may contain a solvent. The solvent may be appropriately selected from the viewpoint of being capable of dissolving or dispersing the material for forming the functional film, easily forming a uniform surface in a coating step and a drying step, securing liquid preservability, having a suitable saturated vapor pressure, and the like. Examples of such an organic solvent include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MIBK), 2-octanone, 2-heptanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, and xylene. One of these solvents may be used alone, or two or more thereof may be used in combination.

Among the solvents, it is preferable to use at least one of dimethyl carbonate, methyl acetate, ethyl acetate, methyl ethyl ketone, acetyl acetone, or acetone, it is more preferable to use any of dimethyl carbonate and methyl acetate, and it is particularly preferable to use methyl acetate.

The solvent is used such that the concentration of the solid content of the composition for forming a functional film is preferably in a range of 5% to 80% by mass, more preferably in a range of 10% to 75% by mass, and even more preferably in a range of 15% to 70% by mass.

(Additive)

In the functional film, known additives can be adequately mixed. For example, in a case where the functional film is used as a polarizing plate protective film, as known additives, a low molecular weight plasticizer, a leveling agent, an oligomer-based additive, a polyester-based additive, a retardation control agent, a matting agent, an ultraviolet absorber, a deterioration inhibitor, a peeling promoter, an infrared absorber, an antioxidant, a filler, a compatibilizer, and the like may be used.

<Polyester-Based Additive>

In a case where the functional film is applied and formed on a substrate including a polyester resin, the adhesion between the functional film and the substrate can be improved by incorporating a polyester-based additive into the functional film. Although the details of the reason are not apparent, it is considered that since the polyester-based additive is similar in hydrophilic and hydrophobic properties and molecular structure to the polyester resin contained in the substrate, the interaction therebetween occurs and adhesion is improved. In addition, in a case where the functional film includes the above-described resin (d), it is considered that by making the additive be similar in hydrophilic and hydrophobic properties and structure to the resin (d), the additive is compatible with the resin (d) and thus the transparency of functional film can be maintained. For example, in a case where the resin (d) included in the functional film is a polystyrene-based resin, it is considered that the structure of the polyester-based additive secures compatibility with the polystyrene-based resin in that the ester structure interacts with the polyester resin in the substrate and has an aromatic ring, and as a result, the adhesion between the functional film and the substrate film is improved.

The polyester-based additive can be obtained by a known method such as a dehydration condensation reaction of a polybasic acid and a polyhydric alcohol, or addition and dehydration condensation reaction of dianhydride with a polyhydric alcohol, and is preferably a polycondensed ester formed from a dibasic acid and a diol.

The weight-average molecular weight (Mw) of the polyester-based additive is preferably 500 to 50,000, more preferably 750 to 40000, and even more preferably 2000 to 30000.

A case where the weight-average molecular weight (Mw) of the polyester-based additive is 500 or more is preferable from the viewpoint of brittleness and moisture-heat resistance, and a case where the weight-average molecular weight is 50,000 or less is preferable from the viewpoint of compatibility with resin.

The weight-average molecular weight (Mw) of the polyester-based additive can be measured by the same method as in the above description of the resin (d).

As the dibasic acid constituting the polyester-based additive, a dicarboxylic acid can be preferably used.

Examples of the dicarboxylic acid include aliphatic dicarboxylic acids and aromatic dicarboxylic acids, and an aromatic dicarboxylic acid, or a mixture of an aromatic dicarboxylic acid and an aliphatic dicarboxylic acid can be preferably used.

Among the aromatic dicarboxylic acids, an aromatic dicarboxylic acid having 8 to 20 carbon atoms is preferable, and an aromatic dicarboxylic acid having 8 to 14 carbon atoms is more preferable. Specifically, at least one selected from phthalic acid, isophthalic acid, and terephthalic acid is preferable.

Among the aliphatic dicarboxylic acids, an aliphatic dicarboxylic acid having 3 to 8 carbon atoms is preferable, and an aliphatic dicarboxylic acid having 4 to 6 carbon atoms is more preferable. Specifically, at least one selected from succinic acid, maleic acid, adipic acid, and glutaric acid is preferable and at least one selected from succinic acid and adipic acid is more preferable.

Examples of the diol constituting the polyester-based additive include aliphatic diols and aromatic diols, and aliphatic diols are particularly preferable.

Among the aliphatic diols, an aliphatic diol having 2 to 4 carbon atoms is preferable and an aliphatic diol having 2 or 3 carbon atoms is more preferable.

Examples of the aliphatic diol include ethylene glycol, diethylene glycol, 1,2-propylene glycol, 1,3-propylene glycol, 1,3-butylene glycol, and 1,4-butylene glycol, and these may be used alone or in combination of two or more thereof.

It is particularly preferable that the polyester-based additive is a compound obtained by condensing at least one selected from phthalic acid, isophthalic acid, and terephthalic acid and an aliphatic diol.

The terminal of the polyester-based additive may be blocked with reacting with a monocarboxylic acid. As the example of the monocarboxylic acid used in blocking, an aliphatic monocarboxylic acid is preferable, acetic acid, propionic acid, butanoic acid, benzoic acid and derivatives thereof are preferable, acetic acid or propionic acid is more preferable, and acetic acid is most preferable.

Examples of commercially available polyester-based compounds include ester-based resin polyesters (for example, LP050, TP290, LP035, LP033. TP217, and TP220) manufactured by Nippon Synthetic Chemical Industry Co., Ltd., and ester-based resins VYLON (VYLON 245, VYLON GK 890, VYLON 103, VYLON 200, VYLON 550 GK 880) manufactured by Toyobo Co. Ltd.

The content of the polyester-based additive in the functional film is preferably 0.1% by mass or more, more preferably 0.5% by mass or more, and even more preferably 1% by mass or more with respect to the total mass of the functional film. In addition, the content of the polyester-based additive of the functional film is preferably 25% by mass or less, more preferably 20% by mass or less, and even more preferably 15% by mass or less with respect to the total mass of the functional film. The above range is preferable from the viewpoint of obtaining appropriate adhesiveness.

(Matting Agent)

Fine particles may be added to the functional film surface for imparting to lubricity and preventing blocking. As fine particles, silica (silicon dioxide, $SiO_2$) of which the surface is coated with a hydrophobic group and which has a morphology of secondary particles is preferably used. Along with silica or in place of silica, other fine particles of titanium dioxide, aluminium oxide, zirconium oxide, calcium carbonate, talc, clay, calcined kaolin, calcined calcium silicate, hydrated calcium silicate, aluminium silicate, magnesium silicate, calcium phosphate, and the like may also be used as fine particles. Examples of commercial products of such fine particles include trade names of R972 and NX90S (both manufactured by Nippon Aerosil Co., Ltd.).

The fine particles function as a so-called matting agent. Addition of such fine particles forms fine unevenness on the film surface, and due to the unevenness, the films do not stick to each other even in a case where the films are overlapped, and the lubricity between the films can be secured. At this time, in a case where the number per $mm^2$ of the fine unevenness formed by fine particles protruding from the film surface and having a height of 30 nm or more is $10^4/mm^2$ or more, the effect of improving the lubricity and blocking resistance is particularly great.

<Preparation of Functional Film>

The functional film can be prepared by a method of forming a coating layer on a substrate film by a known coating method, or a solution film forming method, but a coating method is particularly preferably used.

The functional film can be formed on a substrate film by the following coating methods but there is no limitation thereto. Known methods such as dip coating method, an air knife coating method, a curtain coating method, a roller coating method, a wire bar coating method, a gravure coating method, a slide coating method, an extrusion coating method (die coating method) (refer to JP2003-164788 A), and a microgravure coating method may be used and among these, a microgravure coating method and a die coating method are preferable. In a case where the functional film is formed by a coating method, a drying step of volatilizing a solvent, a thermal crosslinking step of crosslinking a thermally crosslinking group, and a curing step by ionizing radiation irradiation or the like can be appropriately used.

In a case where the composition for forming a functional film includes the above-described compound (b) having a reactive group in the molecule, it is preferable to perform a curing step by ionizing radiation irradiation.

In a case where the composition for forming a functional film does not include the above-described compound (b) having a reactive group in the molecule and the copolymer (a) and the resin (d) each have a thermally crosslinking group, it is preferable to perform a thermal crosslinking step.

Regarding the drying and curing methods of the functional film, preferable examples thereof will described below.

In the present invention, it is effective to cure the functional film by combining irradiation with ionizing radiation and a heat treatment before irradiation, simultaneously with irradiation or after irradiation.

Hereinafter, the time series patterns of several production steps are shown, but the present invention is not limited thereto (the following "-" indicates that the heat treatment is not performed).

Before irradiation→simultaneously with irradiation→after irradiation (1) Heat treatment→ionizing radiation curing→-

(2) Heat treatment→ionizing radiation curing→heat treatment (3)-→ionizing radiation curing→heat treatment Additionally, a step of performing a heat treatment simultaneously with ionizing radiation curing is also preferable.

In the present invention, as described above, it is preferable to perform a heat treatment in combination of irradiation with ionizing radiation. The heat treatment is not particularly limited as long as the functional film is not damaged, but the temperature is preferably 40° C. to 150° C. and more preferably 40° C. to 110° C.

The time required for the heat treatment varies depending on the molecular weight of components to be used, interaction with other components, viscosity, and the like, but the time required for the heat treatment is 15 seconds to 1 hour, preferably 20 seconds to 30 minutes, and most preferably 30 seconds to 5 minutes.

The kind of the ionizing radiation is not particularly limited. Examples thereof include an X-ray, an electron beam, an ultraviolet ray, visible light, and an infrared ray, and an ultraviolet ray is widely used. For example, in a case where the functional film includes an ultraviolet curable component, it is preferable to cure the functional film with an ultraviolet lamp at an irradiation dose of 10 $mJ/cm^2$ to 1000 $mJ/cm^2$. From the viewpoint of the adhesiveness between the adhesive layer and the functional film, the total irradiation dose is more preferably 50 $mJ/cm^2$ to 1000 $mJ/cm^2$.

In the solution film forming method, a solution is prepared by dissolving the material for the functional film in an organic solvent or water, and the solution is uniformly cast on a support after appropriately performing a condensation step, a filtration step, and the like. Next, a half-dry film is peeled off from the support and the solvent is dried in a drying zone while appropriately gripping both ends of the web with clips or the like. The curing step by ionizing radiation irradiation or the like can also be used appropriately. In addition, stretching can be separately performed during the drying of the film or after completion of drying and curing of the film.

The thermal crosslinking step is a step of heating for promoting a reaction of a thermally crosslinking group, and is not particularly limited as long as the properties of the functional film are not damaged. The temperature of the thermal crosslinking step is preferably 40° C. to 200° C. and more preferably 50° C. to 130° C. From the viewpoint of facilitating the reaction more easily, the temperature is preferably 50° C. or higher and from the viewpoint of suppressing deformation of the resin used in the substrate, the temperature is preferably 130° C. or lower.

The time required for heating varies depending on the kind and amount of thermally crosslinking group to be used, but the time required for heating is preferably 5 seconds to 1 hour, more preferably 10 seconds to 30 minutes, and even more preferably 15 seconds to 5 minutes. From the viewpoint of facilitating the reaction more easily, the time required for heating is preferably 15 seconds or longer and from the viewpoint of enhancing productivity, the time is preferably 5 minutes or shorter.

(Substrate Film)

The film thickness of the substrate film used for forming the functional film by a coating method is preferably 5 to 100 μm, more preferably 10 to 75 μm, and even more preferably 15 to 55 μm. In a case where the film thickness is 5 μm or more, sufficient mechanical strength is easily secured and defects such as curling, wrinkling, buckling and the like are not easily caused. Thus, this case is preferable. A case where the film thickness is 100 μm or less is preferable since for example, in a case where the multilayer film of the functional film of the present invention and the substrate film is stored in a long roll rom, it is easy to adjust the surface pressure applied to the multilayer film to be in an appropriate range and adhesion failure is not easily generated.

The surface energy of the substrate film is not particularly limited, and the adhesive force between the functional film and the substrate film can be adjusted by adjusting the relationship between the surface energy of the material of the functional film and the coating solution and the surface energy of the surface of the substrate film on which the functional film is to be formed. In a case where the surface energy difference is reduced, the adhesive force tends to increase, and in a case where the surface energy difference is increased, the adhesive force tends to decrease, and thus the surface energy can be set appropriately.

The surface energy of the substrate film can be calculated from the contact angle value between water and methylene iodide using the Owens method. For measurement of the contact angle, for example, DM901 (contact angle meter, manufactured by Kyowa Interface Science Co., Ltd.) can be used.

The surface energy of the substrate film on which the functional film is to be formed is preferably 41.0 to 48.0 mN/m and more preferably 42.0 to 48.0 mN/m. In a case where the surface energy is 41.0 mN/m or more, the uniformity of the thickness of the functional film is enhanced and thus this case is preferable. In a case where the surface energy is 48.0 mN/m or less, the peeling force between the functional film and the substrate film is easily controlled to be in an appropriate range and thus this case is preferable.

The surface unevenness of the substrate film is not particularly limited and depending on the relationship between the surface energy, the hardness, and the surface unevenness of the functional film surface, and the surface energy and hardness of the surface of the substrate film opposite to the side on which the functional film is formed, for example, in order to prevent adhesion failure in a case where the functional film of the present invention and the substrate film are stored in a long roll form, the surface unevenness of the substrate film can be adjusted. In a case where the surface unevenness is increased, adhesion failure tends to be suppressed, and in a case where the surface unevenness is reduced, the surface unevenness of the functional film tends to decrease and the haze of the functional film tends to be small. Thus, the surface unevenness can be set appropriately.

For such a substrate film, known materials and films can be appropriately used. Specific examples of materials include a polyester-based polymer, an olefin-based polymer, a cyclo olefin-based polymer, a (meth)acrylic polymer, a cellulose-based polymer, and a polyamide-based polymer.

In particular, the polyester-based polymer and the olefin-based polymer are preferable as the material of the substrate film, the polyester-based polymer is more preferable, and polyethylene terephthalate (PET) is particularly preferable among the polyester polymers.

For the purpose of adjusting the surface properties of the substrate film, a surface treatment can be appropriately performed. For example, a corona treatment, a room temperature plasma treatment, a saponification treatment and the like can be performed to lower the surface energy, and a silicone treatment, a fluorine treatment, an olefin treatment and the like can be performed to raise the surface energy.

A releasing agent or the like may be appropriately applied to the substrate surface in advance to control adhesiveness with the functional film. The functional film can be used by peeling off the substrate film after laminating the functional film on a polarizer through an adhesive or a pressure sensitive adhesive in a succeeding step. In a state in which the functional film is laminated on the substrate film, the functional film can be appropriately stretched with the substrate film and thus optical properties and mechanical properties can be adjusted.

<Laminate>

The substrate on which the functional film is applied is constituted of at least a substrate and a functional film and is referred to as a laminate as an integrated one.

The laminate allows the functional film to be bonded with other layers, films, or other articles, and particularly allows the functional film and a polarizer to be bonded through an adhesive layer. In the obtained polarizing plate, the substrate can be peeled off from the functional film or can be used as a part of the polarizing plate as it is without peeling. From the viewpoint of reducing the thickness of the polarizing plate, it is preferable to use the functional film after peeling off the substrate from the functional film.

(Peeling Force Between Functional Film and Substrate Film)

In a case where the functional film used in the polarizing plate is formed by a coating method, the peeling force between the functional film and the substrate film can be controlled by adjusting the material of the functional film, the material of the substrate film, the internal strain of the functional film, and the like. The peeling force can be measured in, for example, a test of peeling off the substrate film in a direction of 900, and the peeling force as measured at a speed of 300 mm/min is preferably 0.001 to 5 N/25 mm, more preferably 0.01 to 3 N/25 mm, and even more preferably 0.05 to 1 N/25 mm. In a case where the peeling force is 0.001 N/25 mm or more, it is possible to prevent peeling of the substrate film in steps other than the peeling step, and in a case where the peeling force is 5 N/25 mm or less, it is possible to prevent peeling failure (for example, zipping or cracking of the functional film) in the peeling step.

If necessary, a heat treatment step, a superheated steam contact step, an organic solvent contact step, and the like can be performed.

[Polarizing Plate]

A polarizing plate having a polarizer, an adhesive layer, and the functional film in this order can be prepared using the functional film.

(Polarizer)

Examples of the polarizer include an iodine-based polarizer and a dye-based polarizer using a dichroic dye a polarizer. The iodine-based polarizer and the dye-based polarizer may generally be produced using a polyvinyl alcohol-based film. In the present invention, any of these polarizers may be used. For example, it is preferable that the polarizer is constituted of a polyvinyl alcohol (PVA) and a dichroic molecule. Regarding the polarizer constituted of a polyvinyl alcohol (PVA) and a dichroic molecule, for example, the description of JP2009-237376A can be referred to. The film thickness of the polarizer may be 1 to 50 μm and is preferably 2 to 30 μm and more preferably 3 to 20 μm.

(Adhesive Layer)

The adhesive layer may be formed from an adhesive. As the adhesive, an adhesive including a resin having a hydroxyl group is preferable, and in addition to a polyvinyl alcohol-based adhesive, an epoxy-based active energy ray curable adhesive, for example, an adhesive which contains an epoxy compound not including an aromatic ring in the molecule as disclosed in JP2004-245925A and is cured by heating or irradiation with an active energy ray, an active energy ray curable adhesive having (a1) a (meth)acrylic compound having two or more (meth)acryloyl groups in the molecule, (b1) a (meth)acrylic compound having a hydroxyl group in the molecule and having only one polymerizable double bond, and (c1) phenol ethylene oxide modified acrylate or nonyl phenol ethylene oxide modified acrylate in a total amount of 100 parts by mass of the (meth)acrylic compounds described in JP2008-174667A, and the like may be used. Among these, a polyvinyl alcohol-based adhesive is most preferable.

The polyvinyl alcohol-based adhesive is an adhesive including modified or unmodified polyvinyl alcohol. The polyvinyl alcohol-based adhesive may contain a crosslinking agent in addition to the modified or unmodified polyvinyl alcohol. Specific examples of the adhesive include an aqueous solution of polyvinyl alcohol or polyvinyl acetal (for example, polyvinyl butyral) and a latex of a vinyl-based polymer (for example, polyvinyl chloride, polyvinyl acetate, or polybutyl acrylate). A particularly preferable adhesive is an aqueous solution of polyvinyl alcohol. In this case, it is preferable that polyvinyl alcohol is completely saponified.

In addition, the epoxy-based active energy ray curable adhesive can be crosslinked with the copolymer (a) since the epoxy group opens by irradiation with active energy rays to generate hydroxyl groups. Therefore, in the present invention, the epoxy-based active energy ray curable adhesive is also included as a hydroxyl group containing adhesive and can be appropriately used.

[Display Device]

The polarizing plate can be used in a display device. The display device is not particularly limited and may be a liquid crystal display device including a liquid crystal cell, an organic EL image display device including an organic EL layer, or a plasma image display device. The polarizing plate of the present invention can be arranged, for example, on the display surface side. Regarding the configuration of the display device, any configuration of a known display device can be adopted.

EXAMPLES

The present invention will be described in more detail with reference to the following Examples. The materials, amount of use, ratio, ratio, details of the treatment, procedures of the treatment, and the like shown in the following Examples can be appropriately changed without departing from the spirit of the present invention. Therefore, it is to be understood that the scope of the present invention should not be interpreted in a limited manner based on the specific examples shown below.

Synthesis Example 1

(Synthesis of Fluorine-Containing Copolymer (A-1-1))

A 200 ml three-neck flask equipped with a stirrer, a thermometer, a reflux condenser, and a nitrogen gas introduction pipe was changed with 10.0 g of cyclohexanone was put into and heated to 84° C. Next, a mixed solution of 9.00 g (21.5 mmol) of 2-(perfluorohexyl)ethyl acrylate, 11.00 g (28.6 mmol) of 4-(4-acryloyloxybutoxy)benzoyloxy phenyl boronic acid, 60.0 g of cyclohexanone, and 1.60 g of "V-601" (manufactured by Wako Pure Chemical Corporation) was added dropwise at a constant rate so that the dropwise addition was completed in 180 minutes. After completion of the dropwise addition, stirring was further continued for 3 hours, then the temperature was raised to 95° C., and stirring was further continued for 2 hours. Thus, 91.0 g of a cyclohexanone solution of a fluorine-containing copolymer (A-1-1) was obtained. The weight-average molecular weight (Mw) of the copolymer was 3,600 (calculated in terms of polystyrene by gel permeation chromatography (EcoSEC HLC-8320GPC (manufactured by Tosoh Corporation)) under the measurement conditions of a flow rate of 0.50 ml/min, and a temperature of 40° C. using an eluent NMP and three columns of TSKgel SuperAWM-H (manufactured by Tosoh Corporation)). In addition, the structure of the obtained copolymer was identified by $^1$H-NMR spectrum to determine the compositional ratio. $^1$H-NMR (CDCl$_3$) δ: 3.8 to 4.5 (2H, 4H, derived from a methylene group of 2-(perfluorohexyl)ethyl acrylate, derived from a methylene group of a repeating unit represented by Compound II-1), 6.8 to 7.3 and 7.6 to 8.2 (8H, derived from an aromatic ring of a repeating unit represented by Compound II-1).

Fluorine-Containing Copolymer (A-1-1)

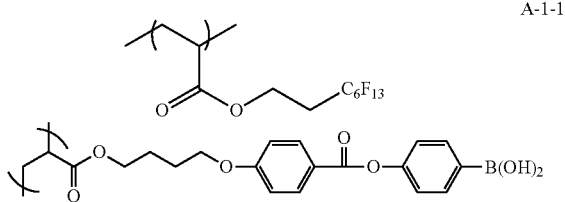

The fluorine-containing copolymer (A-1-1) includes a repeating unit represented by the above structural formula and contains 45% by mass of a repeating unit derived from 2-(perfluorohexyl)ethyl acrylate with respect to the total mass of the copolymer and 55% by mass of a repeating unit derived from 4-(4-acryloyloxybutoxy)benzoyloxy phenyl boronic acid with respect to the total mass of the copolymer.

Synthesis Examples 2 to 21

Fluorine-containing copolymers (A-2) to (A-18), (A-1-2), (A-1-3), and (A-33) were synthesized in the same manner as in the synthesis of the fluorine-containing copolymer (A-1-

1) except that the kind and amount of monomers used in Synthesis Example 1 were changed, the amount of the polymerization initiator was changed to the amounts shown in Table 1 below, and the kind and compositional ratio of repeating units in the composition to be obtained were changed as shown in Table 1 below. (A-1-1), (A-1-2), and (A-1-3) have the same kind of repeating unit to be contained and have different compositional ratios and different the molecular weights. In addition, a third repeating unit shown in Table 1 was further introduced into (A-14) to (A-17).

Synthesis Example 22

(Synthesis Example of Fluorine-Containing Copolymer (A-19-1))

A 500 ml three-neck flask equipped with a stirrer, a thermometer, a reflux condenser, and a nitrogen gas introduction pipe was changed with 23.3 g of cyclohexanone was put into and heated to 78° C. Next, a mixed solution of 69.00 g (165.0 mmol) of 2-(perfluorohexyl)ethyl acrylate, 16.00 g (41.7 mmol) of 4-(4-acryloyloxybutoxy)benzoyloxy phenyl boronic acid, 15.00 g (208.2 mmol) of acrylic acid, 1,3-propanediol (45.8 mmol), 157.7 g of cyclohexanone, 52.5 g of isopropanol, and 5.73 g of "V-601" (manufactured by Wako Pure Chemical Corporation) was added dropwise at a constant rate so that the dropwise addition was completed in 180 minutes. After completion of the dropwise addition, stirring was further continued for 1 hour, then 1.00 g of V-601 was added thereto, and the temperature was raised to 90° C. Further, stirring was continued for 3 hours, and thus 330.0 g of a cyclohexanone solution of a fluorine-containing copolymer (A-19-1) of the present invention was obtained. The weight-average molecular weight (Mw) of the copolymer was 5,700 (calculated in terms of polystyrene by gel permeation chromatography (EcoSEC HLC-8320GPC (manufactured by Tosoh Corporation)) under the measurement conditions of a flow rate of 0.50 ml/min, and a temperature of 40° C. using an eluent NMP and three columns of TSKgel SuperAWM-H (manufactured by Tosoh Corporation)). In addition, the structure of the obtained polymer was identified by $^1$H-NMR spectrum to determine the compositional ratio.

$^1$H-NMR (CDCl$_3$) δ: 3.8 to 4.5 (2H, 4H, derived from a methylene group of 2-(perfluorohexyl)ethyl acrylate, and derived from a methylene group of a repeating unit represented by Compound II-12, derived from a methylene group adjacent to boron of a repeating unit represented by Compound II-12), 6.8 to 7.3 and 7.6 to 8.2 (8H, derived from an aromatic ring of a repeating unit represented by Compound II-12).

Fluorine-Containing Copolymer (A-19-1)

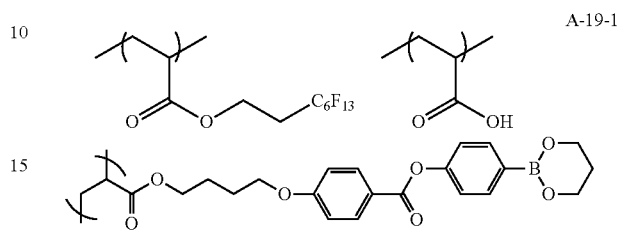

Synthesis Examples 23 to 31

Fluorine-containing copolymers (A-19-2), (A-25-1), (A-25-2). (A-23-1), (A-23-2), (A-20), (A-28), (A-29), and (A-19-3) were synthesized in the same manner as in the synthesis of the fluorine-containing copolymer (A-19-1) except that the kind and amount of monomers used in Synthesis Example 22 were changed, the amount of the polymerization initiator was changed to the amounts shown in Table 1 below, and the kind and compositional ratio of the repeating units in the copolymer to be obtained were changed as shown in Table 1 below. (A-19-1), (A-19-2), and (A-19-3) have the same kind of repeating unit and the same compositional ratio and have different molecular weights. (A-23-1) and (A-23-2) have the same kind of repeating unit and the same compositional ratio and have different molecular weights. (A-25-1) and (A-25-2) have the same kind of repeating unit and the same compositional ratio and have different molecular weights.

In Table 1, the molecular weight (Mw, Mn) and distribution (Mw/Mn) of each of the obtained fluorine-containing copolymers are collectively shown. In addition, the amount of the polymerization initiator in Table 1 is the amount of the polymerization initiator with respect to the total amount of charged monomers expressed by "% by mol".

TABLE 1

|  |  | Repeating until represented by Formula (I) | | Repeating until represented by Formula (II) | | Another repeating unit | | Thermally cross-linking group | Polymerization initiator | | Molecular Weight (GPC) | | |
|---|---|---|---|---|---|---|---|---|---|---|---|---|---|
|  |  | Kind | Part by mass | Kind | Part by mass | Kind | Part by mass | Functional group | Kind | Amount [% by mol] | Mw | Mn | Mw/Mn |
| Synthesis Example 1 | A-1-1 | C6FA | 45 | II-1 | 55 | None | — | — | V-601 | 13.9 | 3600 | 1400 | 2.57 |
| Synthesis Example 2 | A-2 | C6FA | 45 | II-2 | 55 | None | — | — | V-601 | 10.0 | 3800 | 1400 | 2.71 |
| Synthesis Example 3 | A-3 | C6FA | 20 | II-3 | 80 | None | — | — | V-601 | 12.1 | 4200 | 1600 | 2.63 |
| Synthesis Example 4 | A-4 | C6FA | 20 | II-4 | 80 | None | — | — | V-601 | 9.9 | 2800 | 1200 | 2.33 |
| Synthesis Example 5 | A-5 | C6FA | 20 | II-5 | 80 | None | — | — | V-601 | 8.5 | 4600 | 2200 | 2.09 |
| Synthesis Example 6 | A-6 | C8FA | 30 | II-1 | 70 | None | — | — | V-601 | 14.3 | 5200 | 2300 | 2.26 |
| Synthesis Example 7 | A-7 | C6FHA | 25 | II-1 | 75 | None | — | — | V-601 | 12.2 | 4400 | 1900 | 2.32 |

TABLE 1-continued

|  |  | Repeating until represented by Formula (I) |  | Repeating until represented by Formula (II) |  | Another repeating unit |  | Thermally cross-linking group | Polymerization initiator |  | Molecular Weight (GPC) | | |
|---|---|---|---|---|---|---|---|---|---|---|---|---|---|
|  |  | Kind | Part by mass | Kind | Part by mass | Kind | Part by mass | Functional group | Kind | Amount [% by mol] | Mw | Mn | Mw/Mn |
| Synthesis Example 8 | A-8 | C6FA | 30 | II-6 | 70 | None | — | — | V-601 | 12.9 | 4800 | 2100 | 2.29 |
| Synthesis Example 9 | A-9 | C6FA | 20 | II-7 | 80 | None | — | — | V-601 | 9.4 | 4200 | 1900 | 2.21 |
| Synthesis Example 10 | A-10 | C6FA | 70 | II-8 | 30 | None | — | — | V-601 | 6.6 | 5900 | 2200 | 2.68 |
| Synthesis Example 11 | A-11 | C6FA | 40 | II-9 | 60 | None | — | — | V-601 | 18.0 | 5500 | 2100 | 2.62 |
| Synthesis Example 12 | A-12 | C6FA | 50 | II-10 | 50 | None | — | — | V-601 | 11.1 | 6500 | 2800 | 2.32 |
| Synthesis Example 13 | A-13 | C6FA | 40 | II-11 | 60 | None | — | — | V-601 | 13.4 | 3200 | 1300 | 2.46 |
| Synthesis Example 14 | A-14 | C6FA | 45 | II-1 | 25 | Si | 30 | — | V-601 | 7.5 | 5500 | 1500 | 3.67 |
| Synthesis Example 15 | A-15 | C6FA | 45 | II-1 | 25 | PhOEA | 30 | — | V-601 | 11.6 | 10200 | 4500 | 2.27 |
| Synthesis Example 16 | A-16 | C6FA | 45 | II-1 | 50 | AA | 5 | COOH | V-601 | 11.3 | 11200 | 4400 | 2.55 |
| Synthesis Example 17 | A-17 | C6FA | 30 | II-1 | 25 | AS-6S | 45 | OH | V-601 | 6.0 | 16000 | 5600 | 2.86 |
| Synthesis Example 18 | A-18 | FM-0725 | 30 | II-1 | 70 | None | — | — | V-601 | 13.7 | 3600 | 1500 | 2.40 |
| Synthesis Example 19 | A-1-2 | C6FA | 55 | II-1 | 45 | None | — | — | V-601 | 13.9 | 3900 | 1600 | 2.44 |
| Synthesis Example 20 | A-1-3 | C6FA | 70 | II-1 | 30 | None | — | — | V-601 | 14.1 | 2900 | 1300 | 2.23 |
| Synthesis Example 21 | A-33 | C6FA | 55 | BEA | 45 | None | — | — | V-601 | 8.5 | 4200 | 1800 | 2.33 |
| Synthesis Example 22 | A-19-1 | C6FA | 69 | II-12 | 16 | AA | 15 | COOH | V-601 | 6.0 | 5700 | 1600 | 3.56 |
| Synthesis Example 23 | A-19-2 | C6FA | 69 | II-12 | 16 | AA | 15 | COOH | V-601 | 0.2 | 43100 | 5700 | 4.07 |
| Synthesis Example 24 | A-25-1 | C6FA | 45 | II-12 | 25 | SA | 30 | COOH | V-601 | 6.0 | 7300 | 1500 | 4.87 |
| Synthesis Example 25 | A-25-2 | C6FA | 60 | II-12 | 10 | SA | 30 | COOH | V-601 | 0.3 | 52300 | 13400 | 3.90 |
| Synthesis Example 26 | A-23-1 | C6FA | 45 | II-12 | 25 | PhA | 30 | COOH | V-601 | 6.0 | 4600 | 2200 | 2.09 |
| Synthesis Example 27 | A-23-2 | C6FA | 62 | II-12 | 8 | PhA | 30 | COOH | V-601 | 0.2 | 48800 | 12600 | 3.87 |
| Synthesis Example 28 | A-20 | C6FA | 69 | II-14 | 16 | AA | 15 | COOH | V-601 | 6.0 | 5200 | 1800 | 2.89 |
| Synthesis Example 29 | A-28 | C6FA | 70 | II-12 | 10 | IPOz | 20 | Oxazoline group | V-601 | 7.2 | 5600 | 1900 | 2.95 |
| Synthesis Example 30 | A-29 | C6FA | 35 | II-12 | 20 | M-100 | 45 | Epoxy group | V-601 | 5.5 | 8800 | 2800 | 3.14 |
| Synthesis Example 31 | A-19-3 | C6FA | 60 | II-12 | 11 | AA | 29 | COOH | V-601 | 0.2 | 43100 | 10600 | 4.07 |

Abbreviations in Table 1 mean repeating units derived from the following compounds.

C6FHA: 1H,1H,7H-dodecafluoroheptyl acrylate
C6FA: 2-(perfluorohexyl)ethyl acrylate
C8FA: 2-(perfluorooctyl)ethyl acrylate
St: Styrene
PhOEA: Phenoxyethyl acrylate
AA: Acrylic acid
AS-6S: Polystyrene graft type acrylate (manufactured by Toagosei Co., Ltd.)
FM-0725: SILAPLANE FM-0725 (manufactured by JNC Corporation)
V-601: Azo initiator (manufactured by Wako Pure Chemical Corporation)
SA: 2-acryloyloxyethyl succinate
PhA: 2-methacryloyloxyethyl phthalate
BEA: 2-boroxyethyl acrylate
IPOz: Isopropenyloxazoline
M-100: CYCLOMER M-100 (manufactured by Daicel Corporation)

According to paragraph [0044] of JP2005-248116A and paragraph [0159] of JP2000-102727A, the following comparative example compounds (H-1) and (H-2) were obtained.

Comparative Example Compound (H-1) (Compound of Example 1 of JP2005-248116A)

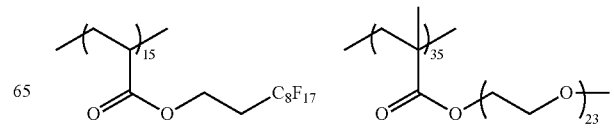

-continued

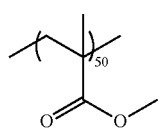

(H-2) (Compound of Example 1 of JP 2000-102727A)

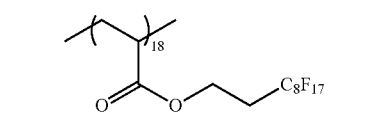

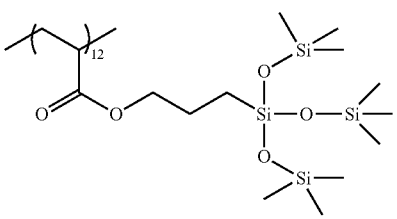

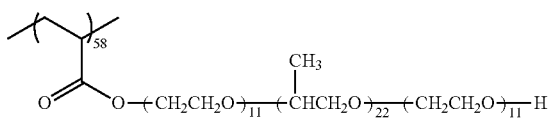

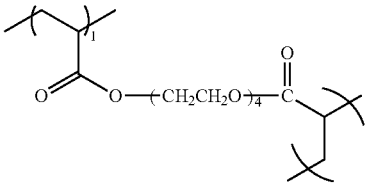

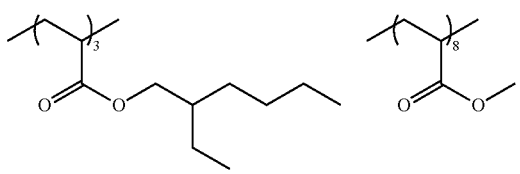

(H-3)
F-552: Commercially available fluorine-based surface modifier (trade name: MEGAFAC F-552, manufactured by DIC Corporation)

[Polystyrene-Based Resin for Functional Film]

Synthesis Example 1P

A 300 ml three-neck flask equipped with a with a stirrer, a thermometer, a reflux condenser, and a nitrogen gas introduction pipe was charged with 20.0 g of methyl ethyl ketone, and heated to 80° C. Next, a mixed solution of 32.0 g of styrene, 8.0 g of CYCLOMER M-100 (manufactured by Daicel Corporation), 20.0 g of methyl ethyl ketone, and 0.04 g of "V-601" (manufactured by Wako Pure Chemical Corporation) was added dropwise at a constant rate so that the dropwise addition was completed in 3 hours. After completion of the dropwise addition, stirring was further continued for 1 hour, then (1) a solution of 0.01 g of V-601 and 1.0 g of methyl ethyl ketone was added thereto, and stirring was performed for 2 hours. Subsequently, the step of (1) was repeated two times, stirring was further continued for 2 hours, and then the solution was poured into 1.5 liters of n-hexane and dried. Thus, 39.5 g of styrene-CYCLOMER M copolymer (B-4) was obtained. The weight-average molecular weight (Mw) of the polymer was 156200 (calculated in terms of polystyrene by gel permeation chromatography (GPC) using columns of TSKgel SuperHZM-H, TSKgel SuperHZ4000, and TSKgel SuperHZ200 (manufactured by Tosoh Corporation)).

B-4

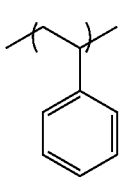 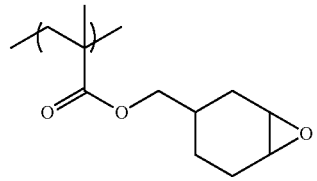

<Preparation of Coating Solution for Forming Functional Film>

Coating solutions for forming a functional film 1 to 45 were prepared at compositions shown Table 2 to 6. In Tables 2 to 6, "%" represents "% by mass", numerical values in the solvent represent the content of each solvent contained in the total amount of the coating solution, and numerical values in other components represent the contents in the components in the coating solution excluding the solvent.

TABLE 2

| | | Coating solution 1 | Coating solution 2 | Coating solution 3 | Coating solution 4 | Coating solution 5 | Coating solution 6 | Coating solution 7 | Coating solution 8 | Coating solution 9 | Coating solution 10 |
|---|---|---|---|---|---|---|---|---|---|---|---|
| Component (a) | A-1-1 | 1.0% | 1.0% | | | | | | | | |
| | A-1-2 | | | 1.0% | | | | | | | |
| | A-1-3 | | | | 1.0% | | | | | | |
| | A-2 | | | | | | | | | | |
| | A-3 | | | | | | | | | | |
| | A-4 | | | | | | | | | | |
| | A-5 | | | | | | | | | | |
| | A-6 | | | | | | | | | | |
| | A-7 | | | | | | | | | | |
| | A-8 | | | | | | | | | | |
| | A-9 | | | | | | | | | | |
| | A-10 | | | | | | | | | | |
| | A-11 | | | | | | | | 1.0% | | |
| | A-12 | | | | | | | | | | |
| | A-13 | | | | | | | | | | |
| | A-14 | | | | | | | | | | |

TABLE 2-continued

|  |  | Coating solution 1 | Coating solution 2 | Coating solution 3 | Coating solution 4 | Coating solution 5 | Coating solution 6 | Coating solution 7 | Coating solution 8 | Coating solution 9 | Coating solution 10 |
|---|---|---|---|---|---|---|---|---|---|---|---|
|  | A-15 | | | | | | | | | | |
|  | A-16 | | | | | | | | | | |
|  | A-17 | | | | | | | | | | |
|  | A-18 | | | | | | 1.0% | | | | |
|  | A-19-1 | | | | | | | | | | |
|  | A-19-2 | | | | | | | | | | |
|  | A-19-3 | | | | | | | | | | |
|  | A-20 | | | | | | | | | | |
|  | A-23-1 | | | | | | | | | | |
|  | A-23-2 | | | | | | | | | | |
|  | A-25-1 | | | | | | | | | | |
|  | A-25-2 | | | | | | | | | | |
|  | A-28 | | | | | | | | | | |
|  | A-29 | | | | | | | | | | |
|  | A-33 | | | | | | | | | | |
|  | H-1 | | | | | | | 1.0% | | | |
|  | H-2 | | | | | | | | 1.0% | | |
|  | H-3 | | | | | | | | | 1.0% | |
| Component (b) | ADCP | 96% | 46% | 46% | 46% | 46% | 46% | 46% | 46% | 46% | 47% |
| Component (c) | Irgacure 127 | 3% | 3% | 3% | 3% | 3% | 3% | 3% | 3% | 3% | 3% |
| Component (d) | SGP-10 | | 50% | 50% | 50% | 50% | 50% | 50% | 50% | 50% | 50% |
|  | ARTON RX 4500 | | | | | | | | | | |
|  | Compound C | | | | | | | | | | |
|  | EPOCROS RPS-1005 | | | | | | | | | | |
|  | SMA-3840 | | | | | | | | | | |
|  | B-4 | | | | | | | | | | |
| Component (e) | VYLON 550 | | | | | | | | | | |
| Solvent | Ethyl acetate | 100% | 100% | 100% | 100% | 100% | 100% | 100% | 100% | 100% | 100% |
|  | Toluene | | | | | | | | | | |
|  | Dichloromethane | | | | | | | | | | |

TABLE 3

|  |  | Coating solution 11 | Coating solution 12 | Coating solution 13 | Coating solution 14 | Coating solution 15 | Coating solution 16 | Coating solution 17 | Coating solution 18 | Coating solution 19 | Coating solution 20 |
|---|---|---|---|---|---|---|---|---|---|---|---|
| Component (a) | A-1-1 | | | | | | | | | | |
|  | A-1-2 | | | | | | | | | | |
|  | A-1-3 | | | | | | | | | | |
|  | A-2 | 1.0% | | | | | | | | | |
|  | A-3 | | 1.0% | | | | | | | | |
|  | A-4 | | | 1.0% | | | | | | | |
|  | A-5 | | | | 1.0% | | | | | | |
|  | A-6 | | | | | 1.0% | | | | | |
|  | A-7 | | | | | | 1.0% | | | | |
|  | A-8 | | | | | | | 1.0% | | | |
|  | A-9 | | | | | | | | 1.0% | | |
|  | A-10 | | | | | | | | | 1.0% | |
|  | A-11 | | | | | | | | | | |
|  | A-12 | | | | | | | | | | 1.0% |
|  | A-13 | | | | | | | | | | |
|  | A-14 | | | | | | | | | | |
|  | A-15 | | | | | | | | | | |
|  | A-16 | | | | | | | | | | |
|  | A-17 | | | | | | | | | | |
|  | A-18 | | | | | | | | | | |
|  | A-19-1 | | | | | | | | | | |
|  | A-19-2 | | | | | | | | | | |
|  | A-19-3 | | | | | | | | | | |
|  | A-20 | | | | | | | | | | |
|  | A-23-1 | | | | | | | | | | |
|  | A-23-2 | | | | | | | | | | |
|  | A-25-1 | | | | | | | | | | |
|  | A-25-2 | | | | | | | | | | |
|  | A-28 | | | | | | | | | | |
|  | A-29 | | | | | | | | | | |
|  | A-33 | | | | | | | | | | |
|  | H-1 | | | | | | | | | | |
|  | H-2 | | | | | | | | | | |
|  | H-3 | | | | | | | | | | |

TABLE 3-continued

|  |  | Coating solution 11 | Coating solution 12 | Coating solution 13 | Coating solution 14 | Coating solution 15 | Coating solution 16 | Coating solution 17 | Coating solution 18 | Coating solution 19 | Coating solution 20 |
|---|---|---|---|---|---|---|---|---|---|---|---|
| Component (b) | ADCP | 46% | 46% | 46% | 46% | 46% | 46% | 46% | 46% | 46% | 46% |
| Component (c) | Irgacure 127 | 3% | 3% | 3% | 3% | 3% | 3% | 3% | 3% | 3% | 3% |
| Component (d) | SGP-10 | 50% | 50% | 50% | 50% | 50% | 50% | 50% | 50% | 50% | 50% |
|  | ARTON RX 4500 |  |  |  |  |  |  |  |  |  |  |
|  | Compound C |  |  |  |  |  |  |  |  |  |  |
|  | EPOCROS RPS-1005 |  |  |  |  |  |  |  |  |  |  |
|  | SMA-3840 |  |  |  |  |  |  |  |  |  |  |
|  | B-4 |  |  |  |  |  |  |  |  |  |  |
| Component (e) | VYLON 550 |  |  |  |  |  |  |  |  |  |  |
| Solvent | Ethyl acetate | 100% | 100% | 100% | 100% | 100% | 100% | 100% | 100% | 100% | 100% |
|  | Toluene |  |  |  |  |  |  |  |  |  |  |
|  | Dichloromethane |  |  |  |  |  |  |  |  |  |  |

TABLE 4

|  |  | Coating solution 21 | Coating solution 22 | Coating solution 23 | Coating solution 24 | Coating solution 25 | Coating solution 26 | Coating solution 27 | Coating solution 28 | Coating solution 29 | Coating solution 30 |
|---|---|---|---|---|---|---|---|---|---|---|---|
| Component (a) | A-1-1 |  |  |  |  |  |  |  |  |  |  |
|  | A-1-2 |  |  |  |  |  |  |  |  |  |  |
|  | A-1-3 |  |  |  |  |  |  |  |  |  |  |
|  | A-2 |  |  |  |  |  |  |  |  |  |  |
|  | A-3 |  |  |  |  |  |  |  |  |  |  |
|  | A-4 |  |  |  |  |  |  |  |  |  |  |
|  | A-5 |  |  |  |  |  |  |  |  |  |  |
|  | A-6 |  |  |  |  |  |  |  |  |  |  |
|  | A-7 |  |  |  |  |  |  |  |  |  |  |
|  | A-8 |  |  |  |  |  |  |  |  |  |  |
|  | A-9 |  |  |  |  |  |  |  |  |  |  |
|  | A-10 |  |  |  |  |  |  |  |  |  |  |
|  | A-11 |  |  |  |  |  |  |  |  |  |  |
|  | A-12 |  |  |  |  |  |  |  |  |  |  |
|  | A-13 | 1.0% |  |  |  |  |  |  |  |  |  |
|  | A-14 |  | 1.0% |  |  |  |  |  |  |  |  |
|  | A-15 |  |  | 1.0% |  |  |  |  |  |  |  |
|  | A-16 |  |  |  | 1.0% | 1.0% | 1.0% |  |  |  |  |
|  | A-17 |  |  |  |  |  |  | 1.0% |  |  |  |
|  | A-18 |  |  |  |  |  |  |  |  |  |  |
|  | A-19-1 |  |  |  |  |  |  |  | 1.0% |  |  |
|  | A-19-2 |  |  |  |  |  |  |  |  | 1.0% |  |
|  | A-19-3 |  |  |  |  |  |  |  |  |  | 1.0% |
|  | A-20 |  |  |  |  |  |  |  |  |  |  |
|  | A-23-1 |  |  |  |  |  |  |  |  |  |  |
|  | A-23-2 |  |  |  |  |  |  |  |  |  |  |
|  | A-25-1 |  |  |  |  |  |  |  |  |  |  |
|  | A-25-2 |  |  |  |  |  |  |  |  |  |  |
|  | A-28 |  |  |  |  |  |  |  |  |  |  |
|  | A-29 |  |  |  |  |  |  |  |  |  |  |
|  | A-33 |  |  |  |  |  |  |  |  |  |  |
|  | H-1 |  |  |  |  |  |  |  |  |  |  |
|  | H-2 |  |  |  |  |  |  |  |  |  |  |
|  | H-3 |  |  |  |  |  |  |  |  |  |  |
| Component (b) | ADCP | 46% | 46% | 46% | 46% |  |  | 46% |  |  |  |
| Component (c) | Irgacure 127 | 3% | 3% | 3% | 3% |  |  | 3% |  |  |  |
| Component (d) | SGP-10 | 50% | 50% | 50% | 50% | 49.5% |  | 49.5% | 49.5% | 49.5% | 49.5% |
|  | ARTON RX 4500 |  |  |  |  |  |  |  |  |  |  |
|  | Compound C |  |  |  |  |  |  |  |  |  |  |
|  | EPOCROS RPS-1005 |  |  |  |  | 49.5% | 99% |  | 49.5% | 49.5% | 49.5% |
|  | SMA-3840 |  |  |  |  |  |  |  |  |  |  |
|  | B-4 |  |  |  |  |  |  |  |  |  |  |
| Component (e) | VYLON 550 |  |  |  |  |  |  |  |  |  |  |
| Solvent | Ethyl acetate | 100% | 100% | 100% | 100% | 100% | 100% | 100% | 100% | 100% | 100% |
|  | Toluene |  |  |  |  |  |  |  |  |  |  |
|  | Dichloromethane |  |  |  |  |  |  |  |  |  |  |

TABLE 5

| | | Coating solution 31 | Coating solution 32 | Coating solution 33 | Coating solution 34 | Coating solution 35 | Coating solution 36 | Coating solution 37 | Coating solution 38 | Coating solution 39 | Coating solution 40 |
|---|---|---|---|---|---|---|---|---|---|---|---|
| Component (a) | A-1-1 | | | | | | | | | | |
| | A-1-2 | | | | | | | | | | |
| | A-1-3 | | | | | | | | | | |
| | A-2 | | | | | | | | | | |
| | A-3 | | | | | | | | | | |
| | A-4 | | | | | | | | | | |
| | A-5 | | | | | | | | | | |
| | A-6 | | | | | | | | | | |
| | A-7 | | | | | | | | | | |
| | A-8 | | | | | | | | | | |
| | A-9 | | | | | | | | | | |
| | A-10 | | | | | | | | | | |
| | A-11 | | | | | | | | | | |
| | A-12 | | | | | | | | | | |
| | A-13 | | | | | | | | | | |
| | A-14 | | | | | | | | | | |
| | A-15 | | | | | | | | | | |
| | A-16 | | | | | | | | | | |
| | A-17 | | | | | | | | | | |
| | A-18 | | | | | | | | | | |
| | A-19-1 | | | | | | | | | | |
| | A-19-2 | | | | | | | | | | |
| | A-19-3 | 0.3% | 0.3% | 0.3% | 10.0% | 15.0% | | | | | |
| | A-20 | | | | | | 1.0% | | | | |
| | A-23-1 | | | | | | | 1.0% | | | |
| | A-23-2 | | | | | | | | 1.0% | | |
| | A-25-1 | | | | | | | | | 1.0% | |
| | A-25-2 | | | | | | | | | | 1.0% |
| | A-28 | | | | | | | | | | |
| | A-29 | | | | | | | | | | |
| | A-33 | | | | | | | | | | |
| | H-1 | | | | | | | | | | |
| | H-2 | | | | | | | | | | |
| | H-3 | | | | | | | | | | |
| Component (b) | ADCP | | | | | | | | | | |
| Component (c) | Irgacure 127 | | | | | | | | | | |
| Component (d) | SGP-10 | 49.85% | 49.35% | | | | | | | | |
| | ARTON RX 4500 | | | | | | | | | | |
| | Compound C | | | | | | | | | | |
| | EPOCROS RPS-1005 | 49.85% | 49.35% | 99.70% | 90% | 85.0% | 99.0% | 99.0% | 99.0% | 99.0% | 99.0% |
| | SMA-3840 | | | | | | | | | | |
| | B-4 | | | | | | | | | | |
| Component (e) | VYLON 550 | | 1.0% | | | | | | | | |
| Solvent | Ethyl acetate | 100% | 100% | 100% | 100% | 100% | 100% | 100% | 100% | 100% | 100% |
| | Toluene | | | | | | | | | | |
| | Dichloromethane | | | | | | | | | | |

TABLE 6

| | | Coating solution 41 | Coating solution 42 | Coating solution 43 | Coating solution 44 | Coating solution 45 |
|---|---|---|---|---|---|---|
| Component (a) | A-1-1 | | | | | |
| | A-1-2 | | | | | |
| | A-1-3 | | | | | |
| | A-2 | | | | | |
| | A-3 | | | | | |
| | A-4 | | | | | |
| | A-5 | | | | | |
| | A-6 | | | | | |
| | A-7 | | | | 1.0% | 1.0% |
| | A-8 | | | | | |
| | A-9 | | | | | |
| | A-10 | | | | | |
| | A-11 | | | | | |
| | A-12 | | | | | |
| | A-13 | | | | | |
| | A-14 | | | | | |
| | A-15 | | | | | |
| | A-16 | | | | | |

TABLE 6-continued

|  |  | Coating solution 41 | Coating solution 42 | Coating solution 43 | Coating solution 44 | Coating solution 45 |
| --- | --- | --- | --- | --- | --- | --- |
|  | A-17 |  |  |  |  |  |
|  | A-18 |  |  |  |  |  |
|  | A-19-1 |  |  |  |  |  |
|  | A-19-2 |  |  |  |  |  |
|  | A-19-3 |  |  |  |  |  |
|  | A-20 |  |  |  |  |  |
|  | A-23-1 |  |  |  |  |  |
|  | A-23-2 |  |  |  |  |  |
|  | A-25-1 |  |  |  |  |  |
|  | A-25-2 |  |  |  |  |  |
|  | A-28 | 1.0% |  |  |  |  |
|  | A-29 |  | 1.0% |  |  |  |
|  | A-33 |  |  | 1.0% |  |  |
|  | H-1 |  |  |  |  |  |
|  | H-2 |  |  |  |  |  |
|  | H-3 |  |  |  |  |  |
| Component (b) | ADCP |  |  | 46% | 46% | 46% |
| Component (c) | Irgacure 127 |  |  | 3% | 3% | 3% |
| Component (d) | SGP-10 |  |  | 50% |  |  |
|  | ARTON RX 4500 |  |  |  | 50% |  |
|  | Compound C |  |  |  |  | 50% |
|  | EPOCROS RPS-1005 |  |  |  |  |  |
|  | SMA-3840 | 99% |  |  |  |  |
|  | B-4 |  | 99% |  |  |  |
| Component (e) | VYLON 550 |  |  |  |  |  |
| Solvent | Ethyl acetate | 100% | 100% | 100% |  |  |
|  | Toluene |  |  |  | 100% |  |
|  | Dichloromethane |  |  |  |  | 100% |

The compounds in Tables 2 to 6 are shown below.

Component (a)
Fluorine-containing copolymers or comparative example compounds above Component (b)
ADCP: Tricyclodecane dimethanol diacrylate (manufactured by Shin-Nakamura Chemical Co., Ltd.)

Component (c)
Irgacure 127: Acylphosphine oxide-based photopolymerization initiator (manufactured by BASF)

Component (d)
SGP-10: Polystyrene (manufactured by PS Japan Corporation)
ARTON RX 4500: Cyclic olefin-based resin (manufactured by JSR Corporation)
Compound C: Cellulose-based resin
EPOCROS RPS-1005: Styrene-oxazoline copolymer (manufactured by Nippon Shokubai Co., Ltd.)
SMA-3840: SMA ester resin (manufactured by KAWA-HARA PETROCHEMICAL CO., LTD.)
B-4: Styrene-CYCLOMER M copolymer (synthetic compound in Synthesis Example 1P above)

Component (e)
VYLON 550: Polyester-based additive (manufactured by Toyobo Co. Ltd.)

Solvent
Ethyl acetate
Toluene
Dichloromethane

As Compound C, a powder of cellulose acetate having a degree of substitution of 2.86 was used. The viscosity average polymerization degree of Compound C was 3(X), the acetyl group substitution degree at the 6th position was 0.89, the acetone extract content was 7% by mass, the mass average molecular weight/number average molecular weight ratio was 2.3, the water content was 0.2% by mass, the viscosity in 6% by mass dichloromethane solution was 305 mPa·s, the amount of residual acetic acid was 0.1% by mass or less, the Ca content was 65 ppm (parts per million), the Mg content was 26 ppm, the iron content was 0.8 ppm, the sulfate ion content was 18 ppm, the yellow index was 1.9, and the free acetic acid content was 47 ppm. The average particle size of the powder was 1.5 mm, and the standard deviation was 0.5 mm.

<Coating of Functional Film>

A commercially available polyethylene terephthalate film, and LUMIRROR (R) S 105 (film thickness: 38 μm, manufactured by Toray Industries, Inc.) were used as substrates and the coating solutions 1 to 45 were used to prepare each of functional films 1 to 45. Specifically, each coating solution was applied to a substrate under the condition of a conveyance speed of 60 m/min by a die coating method using the slot die described Example 1 of JP2006-122889A. and dried at 100° C. for 60 seconds. The coating solutions 1 to 24, 27, and 43 to 45 were further irradiated with an ultraviolet ray with an illuminance of 200 mW/cm$^2$, and an irradiation dose of 100 mJ/cm$^2$ using an air-cooled metal halide lamp (manufactured by Eye Graphics Co. Ltd.) of 160 W/cm at an oxygen concentration of about 0.01% by volume under nitrogen purge to cure each functional film. Then, the functional film was rolled up. In this manner, functional films 1 to 45 were prepared.

The film thickness, contact angle, and equilibrium moisture absorptivity of each of the prepared functional films 1 to 45 were evaluated in the following methods.

<Film Thickness>

The film thickness of the functional film was calculated by measuring the film thickness of a laminate prepared using a contact type film thickness meter and subtracting the substrate thickness measured in the same manner from the film thickness of the laminate. The film thickness of all of the functional films 1 to 45 was 5.0 μm.

<Contact Angle of Water>

A 3 μL liquid droplet was made in a dry state (20° C., relative humidity: 65%) at a needle tip using a contact angle meter ["CA-X" type contact angle meter, manufactured by Kyowa Interface Science Co., Ltd.] and pure water as liquid, and the liquid droplet was brought into contact with the surface of the functional film to make a liquid droplet on the functional film. The angle on a side including the liquid was measured from the angle formed by a normal line to the liquid surface and the functional film surface at a point at which the functional film and the liquid came into contact with each other in 10 seconds after the dropwise addition and considered as the contact angle. The contact angle was evaluated based on the results using the following standards.

A: The contact angle was more than 90°.
B: The contact angle was more than 70° and 90° or less.
C: The contact angle was 70° or less.

The evaluation results of all functional films were A and only the evaluation result of the functional film 10 was C. From the results, it is considered that Component (a) above is unevenly distributed on the surface of the functional films opposite to the surface in contact with the substrate except for the functional film 10.

<Equilibrium Moisture Absorptivity>

The equilibrium moisture absorptivity was measured in the above-described method and evaluated based on the following standards.

A: 1.0% by mass or less
B: More than 1.0% by mass and 2.0% by mass or less
C: More than 2.0% by mass <Preparation of Polarizing Plate>
(Surface Treatment of Film)

A cellulose acetate film (FUJITAC TD40UC, manufactured by Fujifilm Corporation) was immersed in 1.5 mol/L of an aqueous solution of sodium hydroxide (saponification solution) controlled to a temperature of 37° C. for 1 minute and then the film was washed with water. Then, the film was immersed in 0.05 mol/L of an aqueous solution of sulfuric acid for 30 seconds, and further passed through a water washing bath. Then, draining with an air knife was repeated three times, water dripping was performed, and then the film was dried by being retained in a drying zone at 70° C. for 15 seconds. Thus, a cellulose acetate film which was subjected to a saponification treatment was prepared.

(Preparation of Polarizer)

According to Example 1 of JP2001-141926A, a difference in a circumferential speed was imparted to two pairs of nip rolls, stretching was performed in a longitudinal direction, and thus a polarizer having a thickness 12 µm was prepared.

(Lamination)

The polarizer obtained as described above, the functional film, and a material of the cellulose acetate film, which was subjected to the saponification treatment, stored for 3 months in a rolled state were used. The above-described polarizer was interposed therebetween and the polarizer and the films were laminated using the following adhesive shown in Table 7 in a roll-to-roll manner such that the absorption axis of the polarizer was parallel to the longitudinal direction of the film. Here, one surface of the polarizer was set such that the coated surface with any one of the functional films 1 to 45 was disposed on the polarizer side and the other surface of the polarizer was the above-described cellulose acetate film.

Adhesive 1:

A 3% by mass aqueous solution of polyvinyl alcohol (PVA-117H, manufactured by Kuraray Co., Ltd.) was used as an adhesive.

In a case of using the adhesive 1, after lamination, curing was performed at 70@C for 20 minutes by drying.

Adhesive 2:

An ultraviolet curable adhesive with the composition shown below was prepared.

| | |
|---|---|
| CELLOXIDE 2021P | 25 parts by mass |
| ARONOXETANE OXT-221 | 50 parts by mass |
| RIKA RESIN DME-100 | 25 parts by mass |
| Photoacid generator 1 | 5 parts by mass |

CELLOXIDE 2021 P: 3,4-epoxycyclohexylmethyl-3,4'-epoxycyclohexane carboxylate [manufactured by Daicel Corporation]

ARONOXETANE OXT-221: 3-ethyl-3-[(3-ethyloxetan-3-yl)methoxymethyl]oxetane [manufactured by Toagosei Co., Ltd.]

RIKA RESIN DME-100: 1,4-cyclohexanedimethanol diglycidylether [manufactured by Shin-Nihon Kagaku Kogyo Co., Ltd.]

Photoacid generator 1: CPI 100P [manufactured by San-Apro Ltd.]

In a case of using the adhesive 2, curing was performed by irradiation with an ultraviolet ray with an illuminance of 200 mW/cm$^2$, and an irradiation dose of 160 mJ/cm$^2$ using an air-cooled metal halide lamp (manufactured by Eye Graphics Co., Ltd.) of 160 W/cm under the condition of 30° C.

The lamination was continued and polyethylene terephthalate as a substrate was continuously peeled off using the using the same apparatus as the peeling apparatus of a separator to prepare a polarizing plate.

<Evaluation of Adhesiveness of Functional Film and Polarizer>

The adhesiveness between the functional film and the polarizer was evaluated in the following method. The surface of the polarizing plate on which the functional film was laminated was laminated and fixed to the glass substrate through an acrylic pressure sensitive adhesive sheet, and then a slit was made between the functional film and the polarizer with a cutter. The polarizer and the cellulose acetate film at one end of a test piece in a longitudinal direction (one side with a width of 25 mm) were gripped using a tensile test machine RTF-1210 (manufactured by A&D Co., Ltd.) and subjected to a 90-degree peel test (in accordance with JIS K6854-1: 1999 "Adhesives-Determination of peel strength of bonded assemblies—Part 1: 90° peel") under an atmosphere of a temperature of 23° C. and a relative humidity of 60% at a crosshead speed (grip moving speed) of 300 mm/min, and the evaluation on peeling of the functional film and the polarizer was performed. The stress applied to peeling was evaluated based on the following standards.

A: Unpeelable (the polarizing plate was broken or peeling occurred at the interface between the acrylic pressure sensitive adhesive and the functional film.)
B: 5.0 N/25 mm or more
C: 2.0 N/25 mm or more and less than 5.0 N/25 mm
D: 0.5 N/25 mm or more and less than 2.0 N/25 mm
E: Less than 0.5 N/25 mm There is no problem in practical use in the standards A, B, and C. The standards A and B are preferable and the standard A is more preferable.

<Punching Inspection of Polarizing Plate Before Mounting on Liquid Crystal Display Device>

The 100 polarizing plates were punched with Thomson blade of 40 mm×40 mm and the state of peeling and cracking of the end surface was observed and evaluated based on the following standards.

A: No peeling and cracking occurred in 100 polarizing plates.

B: Slight peeling or cracking occurred in 1 or more polarizing plates.

C: Peeling or cracking occurred in 5 or more polarizing plates.

There is no problem in practical use in the standards A and B. The standard A is preferable.

The evaluation results are shown in Table 7.

TABLE 7

| | Coating solution | Functional film | Adhesive | Contact angle of water [°] | Equilibrium moisture absorptivity | Adhesiveness between functional film and polarizer | Punching inspection of polarizing plate |
|---|---|---|---|---|---|---|---|
| Example 1 | 1 | 1 | 1 | A | A | B | A |
| Example 2 | 2 | 2 | 1 | A | A | A | A |
| Example 3 | 2 | 2 | 2 | A | A | A | A |
| Example 4 | 3 | 3 | 1 | A | A | A | A |
| Example 5 | 4 | 4 | 1 | A | A | A | A |
| Example 6 | 5 | 5 | 1 | A | A | B | B |
| Example 7 | 6 | 6 | 1 | A | A | C | B |
| Example 8 | 11 | 11 | 1 | A | A | C | B |
| Example 9 | 12 | 12 | 1 | A | A | C | B |
| Example 10 | 13 | 13 | 1 | A | A | C | B |
| Example 11 | 14 | 14 | 1 | A | A | B | A |
| Example 12 | 15 | 15 | 1 | A | A | B | A |
| Example 13 | 16 | 16 | 1 | A | A | B | A |
| Example 14 | 17 | 17 | 1 | A | A | B | A |
| Example 15 | 18 | 18 | 1 | A | A | B | A |
| Example 16 | 19 | 19 | 1 | A | A | B | A |
| Example 17 | 20 | 20 | 1 | A | A | B | B |
| Example 18 | 21 | 21 | 1 | A | A | C | B |
| Example 19 | 22 | 22 | 1 | A | A | B | B |
| Example 20 | 23 | 23 | 1 | A | A | B | B |
| Example 21 | 24 | 24 | 1 | A | A | B | B |
| Example 22 | 25 | 25 | 1 | A | A | B | A |
| Example 23 | 26 | 26 | 1 | A | A | B | A |
| Example 24 | 27 | 27 | 1 | A | A | B | B |
| Example 25 | 28 | 28 | 1 | A | A | B | A |
| Example 26 | 29 | 29 | 1 | A | A | A | A |
| Example 27 | 30 | 30 | 1 | A | A | A | A |
| Example 28 | 31 | 31 | 1 | A | A | A | A |
| Example 29 | 32 | 32 | 1 | A | A | A | A |
| Example 30 | 32 | 32 | 2 | A | A | A | A |
| Example 31 | 33 | 33 | 1 | A | A | A | A |
| Example 32 | 34 | 34 | 1 | A | A | B | A |
| Example 33 | 35 | 35 | 1 | A | A | B | A |
| Example 34 | 36 | 36 | 1 | A | A | B | A |
| Example 35 | 37 | 37 | 1 | A | A | B | A |
| Example 36 | 38 | 38 | 1 | A | A | A | A |
| Example 37 | 39 | 39 | 1 | A | A | B | A |
| Example 38 | 40 | 40 | 1 | A | A | A | A |
| Example 39 | 41 | 41 | 1 | A | A | B | B |
| Example 40 | 42 | 42 | 1 | A | A | C | B |
| Example 41 | 43 | 43 | 1 | A | A | C | B |
| Example 42 | 44 | 44 | 1 | A | A | B | A |
| Example 43 | 45 | 45 | 1 | A | C | B | A |
| Comparative Example 1 | 7 | 7 | 1 | A | A | E | C |
| Comparative Example 2 | 8 | 8 | 1 | A | A | E | C |
| Comparative Example 3 | 9 | 9 | 1 | A | A | E | C |
| Comparative Example 4 | 10 | 10 | 1 | C | A | E | C |

From Table 7, it was found that the polarizing plate of the present invention had high adhesiveness between the polarizer and the functional film and excellent processing suitability for punching or the like.

According to the present invention, it is possible to provide a copolymer capable of sufficiently bonding the functional film with other layers, films, or other articles, and a composition containing the copolymer.

While the present invention has been described with reference to the detailed or specific embodiments, those skilled in the art will recognize that various changes or modifications can be made without departing from the spirit and scope of the present invention.

The present application is based on Japanese Patent Application filed on Jun. 27, 2016 (JP2016-126440), Japanese Patent Application filed on Sep. 30, 2016 (JP2016-193814), and Japanese Patent Application filed on Jan. 27, 2017 (JP2017-013698), the contents of which are incorporated herein by reference.

What is claimed is:

1. A copolymer comprising:
   a repeating unit represented by the following formula (III); and a repeating unit represented by the following formula (V),

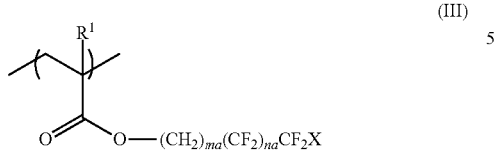
(III)

wherein, in the formula (III), $R^1$ represents a hydrogen atom or an alkyl group having 1 to 20 carbon atoms; ma represents an integer of 1 to 20; na represents an integer of 5 to 7; and X represents a hydrogen atom or a fluorine atom, and

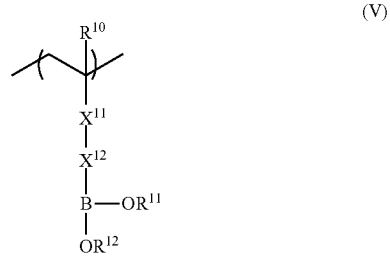
(V)

wherein, in the formula (V), $R^{10}$ represents a hydrogen atom or an alkyl group having 1 to 20 carbon atoms: $R^{11}$ and $R^{12}$ each independently represent a hydrogen atom, a substituted or unsubstituted aliphatic hydrocarbon group, a substituted or unsubstituted aryl group, or a substituted or unsubstituted heteroaryl group: $R^{11}$ and $R^{12}$ may be linked to each other: $X^{11}$ represents a divalent linking group comprising at least one selected from the group consisting of —(C=O)O—, —O(C=O)—, —(C=O)NH—, —O—, —CO— and —CH$_2$—; and $X^{12}$ represents a divalent linking group including at least one linking group selected from —(C=O)O—, —O(C=O)—, —(C=O)NH—, —O—, —CO—, —NH—, —O(C=O)—NH—, —O(C=O)—O— and —CH$_2$— and including 2 to 4 substituted or unsubstituted aromatic rings; and a total number of carbon atoms of $X^{11}$ and $X^{12}$ is 7 or more.

2. The copolymer according to claim 1, further comprising:

a thermally crosslinking group.

3. A composition comprising:

the copolymer according to claim 1.

\* \* \* \* \*